(12) United States Patent
Gaebel, Jr. et al.

(10) Patent No.: US 11,032,518 B2
(45) Date of Patent: Jun. 8, 2021

(54) METHOD AND APPARATUS FOR BOUNDARY-BASED NETWORK OPERATION

(71) Applicant: TIME WARNER CABLE ENTERPRISES LLC, St. Louis, MO (US)

(72) Inventors: Thomas M. Gaebel, Jr., St. Louis, MO (US); Remi Rieger, Austin, TX (US); Paul D. Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 161 days.

(21) Appl. No.: 15/936,270

(22) Filed: Mar. 26, 2018

(65) Prior Publication Data

US 2018/0288369 A1   Oct. 4, 2018

Related U.S. Application Data

(62) Division of application No. 11/186,452, filed on Jul. 20, 2005, now abandoned.

(51) Int. Cl.
*H04N 7/16* (2011.01)
*H04N 21/25* (2011.01)
*H04N 21/258* (2011.01)

(52) U.S. Cl.
CPC .......... *H04N 7/165* (2013.01); *H04N 21/252* (2013.01); *H04N 21/25808* (2013.01); *H04N 21/25841* (2013.01); *H04N 21/25883* (2013.01)

(58) Field of Classification Search
CPC combination set(s) only.
See application file for complete search history.

(56) References Cited

U.S. PATENT DOCUMENTS

| 5,528,284 A | 6/1996 | Iwami et al. |
| 5,708,961 A | 1/1998 | Hylton et al. |

(Continued)

FOREIGN PATENT DOCUMENTS

| JP | 2005519365 A | 6/2005 |
| JP | 2005519501 A | 6/2005 |

(Continued)

OTHER PUBLICATIONS

Cantor, et al., Bindings for the OASIS Security Assertion Markup Language (SAML) V2.0, OASIS Standard, Mar. 2005, Document ID saml-bindings-2.0-os ,(http://docs.oasis-open.org/security/saml/v2.0/saml-bindings-2.0-os.pdf).

(Continued)

*Primary Examiner* — Alexander Gee
(74) *Attorney, Agent, or Firm* — Gazdzinski & Associates, PC

(57) ABSTRACT

Methods and apparatus for enforcing physical or logical boundaries, and targeting specific subscribers or groups of subscribers with particular content, within a network. In an exemplary embodiment, the network comprises a cable network operating according to a broadcast switched architecture (BSA), with a BSA server and a plurality of subscriber premises devices. Individual ones of these devices are identified to the server (such as via a unique identifier), and this information is correlated with one or more other parameters in order to selectively identify physical or logical groups of subscribers within the broader subscriber base. These other parameters may comprise, e.g., the postal zip code or telephone area code/exchange where the premises device is located, or alternatively relate to anecdotal or statistical viewing habits of the subscriber(s). Anonymity of the subscriber's identity, and autonomy from other data (Continued)

bases or sources of subscriber information, is maintained using this approach as well.

19 Claims, 13 Drawing Sheets

(56) References Cited

U.S. PATENT DOCUMENTS

| | | |
|---|---|---|
| 5,719,938 A | 2/1998 | Haas et al. |
| 5,758,257 A | 5/1998 | Herz et al. |
| 5,796,423 A | 8/1998 | Robbins et al. |
| 5,818,438 A | 10/1998 | Howe et al. |
| 5,862,140 A | 1/1999 | Shen et al. |
| 5,897,635 A | 4/1999 | Torres et al. |
| 5,988,078 A | 11/1999 | Levine |
| 6,029,045 A | 2/2000 | Picco et al. |
| 6,052,145 A | 4/2000 | MacRae et al. |
| 6,088,722 A | 7/2000 | Herz et al. |
| 6,133,910 A | 10/2000 | Stinebruner |
| 6,167,432 A | 12/2000 | Jiang |
| 6,181,697 B1 | 1/2001 | Nurenberg et al. |
| 6,198,744 B1 | 3/2001 | Huggins et al. |
| 6,219,710 B1 | 4/2001 | Gray et al. |
| 6,252,634 B1 | 6/2001 | Yuen et al. |
| 6,259,701 B1 | 7/2001 | Shur et al. |
| 6,389,538 B1 | 5/2002 | Gruse et al. |
| 6,446,261 B1 | 9/2002 | Rosser |
| 6,460,182 B1 | 10/2002 | Buabbud |
| 6,463,585 B1 | 10/2002 | Hendricks et al. |
| 6,486,907 B1 | 11/2002 | Farber et al. |
| 6,487,721 B1* | 11/2002 | Safadi ............ H04N 21/234354 725/36 |
| 6,519,062 B1 | 2/2003 | Yoo |
| 6,523,696 B1 | 2/2003 | Saito et al. |
| 6,539,548 B1 | 3/2003 | Hendricks et al. |
| 6,608,837 B1 | 8/2003 | Brodigan |
| 6,640,145 B2 | 10/2003 | Hoffberg et al. |
| 6,694,145 B2 | 2/2004 | Riikonen et al. |
| 6,697,376 B1 | 2/2004 | Son et al. |
| 6,698,020 B1 | 2/2004 | Zigmond et al. |
| 6,728,269 B1 | 4/2004 | Godwin et al. |
| 6,760,537 B2 | 7/2004 | Mankovitz |
| 6,785,904 B1 | 8/2004 | Franken et al. |
| RE38,600 E | 9/2004 | Mankovitz et al. |
| 6,788,676 B2 | 9/2004 | Partanen et al. |
| 6,788,775 B1 | 9/2004 | Simpson |
| 6,799,326 B2 | 9/2004 | Boylan et al. |
| 6,807,676 B1 | 10/2004 | Robbins et al. |
| 6,873,622 B1 | 3/2005 | Dodson et al. |
| 6,925,257 B2 | 8/2005 | Yoo |
| 6,944,150 B1 | 9/2005 | McConnell et al. |
| 7,003,670 B2 | 2/2006 | Heaven et al. |
| 7,006,881 B1 | 2/2006 | Hoffberg et al. |
| 7,009,972 B2 | 3/2006 | Maher et al. |
| 7,027,460 B2 | 4/2006 | Iyer et al. |
| 7,039,048 B1 | 5/2006 | Monta et al. |
| 7,039,932 B2 | 5/2006 | Eldering |
| 7,054,902 B2 | 5/2006 | Toporek et al. |
| 7,068,639 B1 | 6/2006 | Varma et al. |
| 7,085,287 B1 | 8/2006 | Chapman |
| 7,099,308 B2 | 8/2006 | Merrill et al. |
| 7,099,348 B1 | 8/2006 | Warwick |
| 7,106,382 B2 | 9/2006 | Shiotsu |
| 7,149,772 B1 | 12/2006 | Kalavade |
| 7,174,126 B2 | 2/2007 | McElhatten et al. |
| 7,174,127 B2 | 2/2007 | Otten et al. |
| 7,174,385 B2 | 2/2007 | Li |
| 7,185,353 B2 | 2/2007 | Schlack |
| 7,188,085 B2 | 3/2007 | Pelletier |
| 7,209,458 B2 | 4/2007 | Ahvonen et al. |
| 7,213,036 B2 | 5/2007 | Apparao et al. |
| 7,242,960 B2 | 7/2007 | van Rooyen et al. |
| 7,242,988 B1 | 7/2007 | Hoffberg et al. |
| 7,254,608 B2 | 8/2007 | Yeager et al. |
| 7,325,073 B2 | 1/2008 | Shao et al. |
| 7,330,483 B1 | 2/2008 | Peters, Jr. et al. |
| 7,359,375 B2 | 4/2008 | Lipsanen et al. |
| 7,363,643 B2 | 4/2008 | Drake et al. |
| 7,376,386 B2 | 5/2008 | Phillips et al. |
| 7,383,243 B2 | 6/2008 | Conkwright et al. |
| 7,444,655 B2 | 10/2008 | Sardera |
| 7,457,520 B2 | 11/2008 | Rossetti et al. |
| 7,486,869 B2 | 2/2009 | Alexander et al. |
| 7,567,983 B2 | 7/2009 | Pickelsimer et al. |
| 7,592,912 B2 | 9/2009 | Hasek et al. |
| 7,602,820 B2 | 10/2009 | Helms et al. |
| 7,650,319 B2 | 1/2010 | Hoffberg et al. |
| 7,690,020 B2 | 3/2010 | Lebar |
| 7,693,171 B2 | 4/2010 | Gould |
| 7,716,668 B2 | 5/2010 | Moore et al. |
| 7,721,314 B2 | 5/2010 | Sincaglia et al. |
| 7,742,074 B2 | 6/2010 | Minatogawa |
| 7,768,546 B1 | 8/2010 | Boehringer, Jr. |
| 7,770,200 B2 | 8/2010 | Brooks et al. |
| 7,809,942 B2 | 10/2010 | Baran et al. |
| 7,873,660 B1 | 1/2011 | Wong et al. |
| 7,889,765 B2 | 2/2011 | Brooks et al. |
| 7,900,052 B2 | 3/2011 | Jonas et al. |
| 7,954,131 B2 | 5/2011 | Cholas et al. |
| 8,078,669 B2 | 12/2011 | Ladd et al. |
| 8,099,757 B2 | 1/2012 | Riedl et al. |
| 8,244,909 B1 | 8/2012 | Hanson et al. |
| 8,345,677 B2 | 1/2013 | Crookes |
| 8,347,341 B2 | 1/2013 | Markley et al. |
| 8,484,511 B2 | 7/2013 | Engel et al. |
| 9,213,538 B1 | 12/2015 | Ladd et al. |
| 9,215,423 B2 | 12/2015 | Kimble et al. |
| 9,906,838 B2 | 2/2018 | Cronk et al. |
| 2001/0004768 A1 | 6/2001 | Hodge et al. |
| 2001/0033583 A1 | 10/2001 | Rabenko et al. |
| 2002/0007491 A1* | 1/2002 | Schiller ............ H04N 21/47202 725/87 |
| 2002/0010757 A1* | 1/2002 | Granik ................. G06F 16/955 709/218 |
| 2002/0024943 A1 | 2/2002 | Karaul et al. |
| 2002/0027883 A1 | 3/2002 | Belaiche |
| 2002/0032754 A1 | 3/2002 | Logston et al. |
| 2002/0056125 A1 | 5/2002 | Hodge et al. |
| 2002/0059619 A1 | 5/2002 | Lebar |
| 2002/0066033 A1 | 5/2002 | Dobbins et al. |
| 2002/0078444 A1 | 6/2002 | Krewin et al. |
| 2002/0087976 A1 | 7/2002 | Kaplan et al. |
| 2002/0123928 A1 | 9/2002 | Eldering et al. |
| 2002/0133513 A1 | 9/2002 | Townsend et al. |
| 2002/0144260 A1 | 10/2002 | Devara |
| 2002/0147771 A1 | 10/2002 | Traversat et al. |
| 2002/0152299 A1 | 10/2002 | Traversat et al. |
| 2002/0166120 A1 | 11/2002 | Boylan et al. |
| 2002/0178446 A1 | 11/2002 | Sie et al. |
| 2002/0188744 A1 | 12/2002 | Mani |
| 2002/0188869 A1 | 12/2002 | Patrick |
| 2003/0002577 A1 | 1/2003 | Pinder |
| 2003/0016701 A1 | 1/2003 | Hinson |
| 2003/0023983 A1 | 1/2003 | Pidgeon et al. |
| 2003/0028888 A1 | 2/2003 | Hunter et al. |
| 2003/0056217 A1 | 3/2003 | Brooks |
| 2003/0115267 A1 | 6/2003 | Hinton et al. |
| 2003/0121055 A1 | 6/2003 | Kaminski et al. |
| 2003/0126611 A1 | 7/2003 | Chernock et al. |
| 2003/0126618 A1 | 7/2003 | Wright |
| 2003/0149975 A1 | 8/2003 | Eldering et al. |
| 2003/0165241 A1 | 9/2003 | Fransdonk |
| 2003/0166401 A1 | 9/2003 | Combes et al. |
| 2003/0208767 A1 | 11/2003 | Williamson et al. |
| 2003/0213001 A1 | 11/2003 | Yuen et al. |
| 2003/0217137 A1 | 11/2003 | Roese et al. |
| 2003/0217365 A1 | 11/2003 | Caputo |
| 2003/0220100 A1 | 11/2003 | McElhatten et al. |
| 2003/0221191 A1 | 11/2003 | Khusheim |
| 2003/0225777 A1 | 12/2003 | Marsh |
| 2004/0015398 A1 | 1/2004 | Hayward |
| 2004/0024880 A1 | 2/2004 | Elving et al. |
| 2004/0034877 A1 | 2/2004 | Nogues |
| 2004/0040035 A1 | 2/2004 | Carlucci et al. |

(56) References Cited

U.S. PATENT DOCUMENTS

| | | |
|---|---|---|
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0133923 A1 | 7/2004 | Watson et al. |
| 2004/0137918 A1 | 7/2004 | Varonen et al. |
| 2004/0148625 A1* | 7/2004 | Eldering .......... H04N 21/23424 725/34 |
| 2004/0158858 A1 | 8/2004 | Paxton et al. |
| 2004/0181800 A1 | 9/2004 | Rakib et al. |
| 2004/0190515 A1 | 9/2004 | Nogima |
| 2004/0226043 A1 | 11/2004 | Mettu et al. |
| 2004/0230994 A1 | 11/2004 | Urdang et al. |
| 2004/0250273 A1 | 12/2004 | Swix et al. |
| 2005/0022247 A1 | 1/2005 | Bitran et al. |
| 2005/0034171 A1 | 2/2005 | Benya |
| 2005/0049886 A1 | 3/2005 | Grannan et al. |
| 2005/0055220 A1 | 3/2005 | Lee et al. |
| 2005/0055685 A1 | 3/2005 | Maynard et al. |
| 2005/0060742 A1* | 3/2005 | Riedl ................ G06Q 30/0272 725/34 |
| 2005/0086334 A1 | 4/2005 | Aaltonen et al. |
| 2005/0086683 A1 | 4/2005 | Meyerson |
| 2005/0108763 A1 | 5/2005 | Baran et al. |
| 2005/0114900 A1 | 5/2005 | Ladd et al. |
| 2005/0125824 A1 | 6/2005 | Bienstock |
| 2005/0177855 A1 | 8/2005 | Maynard et al. |
| 2005/0187823 A1 | 8/2005 | Howes |
| 2005/0190794 A1 | 9/2005 | Krause et al. |
| 2005/0198686 A1 | 9/2005 | Krause et al. |
| 2005/0216933 A1 | 9/2005 | Black |
| 2005/0228725 A1 | 10/2005 | Rao et al. |
| 2005/0235307 A1 | 10/2005 | Relan et al. |
| 2005/0240967 A1* | 10/2005 | Anderson ............ H04N 21/812 725/52 |
| 2005/0289618 A1 | 12/2005 | Hardin |
| 2006/0017846 A1 | 1/2006 | Kim et al. |
| 2006/0020786 A1 | 1/2006 | Helms et al. |
| 2006/0021004 A1 | 1/2006 | Moran et al. |
| 2006/0041905 A1 | 2/2006 | Wasilewski |
| 2006/0047957 A1 | 3/2006 | Helms et al. |
| 2006/0088062 A1 | 4/2006 | Arsenault et al. |
| 2006/0095940 A1 | 5/2006 | Yearwood |
| 2006/0117354 A1 | 6/2006 | Schutte et al. |
| 2006/0130099 A1 | 6/2006 | Rooyen |
| 2006/0130101 A1 | 6/2006 | Wessel van Rooyen et al. |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0149624 A1 | 7/2006 | Baluja et al. |
| 2006/0149850 A1 | 7/2006 | Bowman |
| 2006/0156332 A1 | 7/2006 | Kendall |
| 2006/0161635 A1 | 7/2006 | Lamkin et al. |
| 2006/0168609 A1 | 7/2006 | Chen |
| 2006/0171390 A1 | 8/2006 | La Joie |
| 2006/0171423 A1 | 8/2006 | Helms et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218604 A1 | 9/2006 | Riedl et al. |
| 2006/0225118 A1 | 10/2006 | Rolls et al. |
| 2006/0233372 A1 | 10/2006 | Shaheen et al. |
| 2006/0248553 A1 | 11/2006 | Mikkelson et al. |
| 2006/0248556 A1 | 11/2006 | Yuen et al. |
| 2006/0251097 A1 | 11/2006 | Chapman et al. |
| 2006/0259927 A1 | 11/2006 | Acharya et al. |
| 2006/0287915 A1 | 12/2006 | Boulet et al. |
| 2006/0291506 A1 | 12/2006 | Cain |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0033531 A1 | 2/2007 | Marsh |
| 2007/0040934 A1 | 2/2007 | Ramaswamy |
| 2007/0049245 A1 | 3/2007 | Lipman |
| 2007/0055984 A1 | 3/2007 | Schiller et al. |
| 2007/0061023 A1 | 3/2007 | Hoffberg et al. |
| 2007/0067851 A1 | 3/2007 | Fernando et al. |
| 2007/0076728 A1 | 4/2007 | Rieger et al. |
| 2007/0094691 A1 | 4/2007 | Gazdzinski |
| 2007/0121678 A1 | 5/2007 | Brooks et al. |
| 2007/0124488 A1 | 5/2007 | Baum et al. |
| 2007/0136777 A1 | 6/2007 | Hasek et al. |
| 2007/0157262 A1 | 7/2007 | Ramaswamy et al. |
| 2007/0180230 A1 | 8/2007 | Cortez |
| 2007/0186228 A1 | 8/2007 | Ramaswamy et al. |
| 2007/0198839 A1 | 8/2007 | Carle et al. |
| 2007/0204314 A1 | 8/2007 | Hasek et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0245376 A1 | 10/2007 | Svendsen |
| 2007/0250880 A1 | 10/2007 | Hainline |
| 2007/0261116 A1 | 11/2007 | Prafullchandra et al. |
| 2007/0276926 A1 | 11/2007 | Lajoie et al. |
| 2007/0280298 A1 | 12/2007 | Hearn et al. |
| 2007/0288715 A1 | 12/2007 | Boswell et al. |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0112405 A1 | 5/2008 | Cholas et al. |
| 2008/0120667 A1 | 5/2008 | Zaltsman |
| 2008/0133551 A1 | 6/2008 | Wensley et al. |
| 2008/0155059 A1 | 6/2008 | Hardin et al. |
| 2008/0162353 A1 | 7/2008 | Tom et al. |
| 2008/0170551 A1 | 7/2008 | Zaks |
| 2008/0172287 A1 | 7/2008 | Tien et al. |
| 2008/0177998 A1 | 7/2008 | Apsangi et al. |
| 2008/0201386 A1 | 8/2008 | Maharajh et al. |
| 2008/0201731 A1 | 8/2008 | Howcroft |
| 2008/0209489 A1 | 8/2008 | Joyce et al. |
| 2008/0222684 A1 | 9/2008 | Mukraj et al. |
| 2008/0229379 A1 | 9/2008 | Akhter |
| 2008/0235746 A1 | 9/2008 | Peters et al. |
| 2008/0273591 A1 | 11/2008 | Brooks et al. |
| 2008/0279534 A1 | 11/2008 | Buttars |
| 2008/0282299 A1 | 11/2008 | Koat et al. |
| 2008/0306903 A1 | 12/2008 | Larson et al. |
| 2009/0031341 A1* | 1/2009 | Schlack ............... H04N 5/4401 725/38 |
| 2009/0083813 A1 | 3/2009 | Dolce et al. |
| 2009/0086643 A1 | 4/2009 | Kotrla et al. |
| 2009/0098861 A1 | 4/2009 | Kalliola et al. |
| 2009/0100459 A1 | 4/2009 | Riedl et al. |
| 2009/0100493 A1 | 4/2009 | Jones et al. |
| 2009/0133048 A1 | 5/2009 | Gibbs et al. |
| 2009/0150917 A1 | 6/2009 | Huffman et al. |
| 2009/0150926 A1 | 6/2009 | Schlack |
| 2009/0172776 A1 | 7/2009 | Makagon et al. |
| 2009/0185576 A1 | 7/2009 | Kisel et al. |
| 2009/0201917 A1 | 8/2009 | Maes et al. |
| 2009/0210912 A1 | 8/2009 | Cholas et al. |
| 2009/0217318 A1 | 8/2009 | Versteeg et al. |
| 2009/0217326 A1 | 8/2009 | Hasek |
| 2009/0225760 A1 | 9/2009 | Foti |
| 2009/0228569 A1 | 9/2009 | Kalmanje et al. |
| 2009/0249421 A1 | 10/2009 | Liu et al. |
| 2009/0282241 A1 | 11/2009 | Prafullchandra et al. |
| 2009/0292816 A1 | 11/2009 | Etchegoyen et al. |
| 2009/0293101 A1 | 11/2009 | Carter et al. |
| 2010/0005527 A1 | 1/2010 | Jeon |
| 2010/0027560 A1 | 2/2010 | Yang et al. |
| 2010/0030578 A1 | 2/2010 | Siddique et al. |
| 2010/0042478 A1 | 2/2010 | Reisman |
| 2010/0083329 A1 | 4/2010 | Joyce et al. |
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0122276 A1 | 5/2010 | Chen |
| 2010/0125658 A1 | 5/2010 | Strasters |
| 2010/0131973 A1 | 5/2010 | Dillon et al. |
| 2010/0138900 A1 | 6/2010 | Peterka et al. |
| 2010/0169977 A1 | 7/2010 | Dasher et al. |

(56) References Cited

U.S. PATENT DOCUMENTS

| | | |
|---|---|---|
| 2010/0199299 A1 | 8/2010 | Chang et al. |
| 2010/0211967 A1* | 8/2010 | Ramaswamy ......... H04H 60/59 725/14 |
| 2010/0211982 A1 | 8/2010 | Lee et al. |
| 2010/0218231 A1 | 8/2010 | Frink et al. |
| 2010/0280641 A1 | 11/2010 | Harkness et al. |
| 2010/0287209 A1 | 11/2010 | Hauser |
| 2010/0287609 A1 | 11/2010 | Gonzalez et al. |
| 2010/0313225 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0071841 A1 | 3/2011 | Fomenko et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0110515 A1 | 5/2011 | Tidwell et al. |
| 2011/0126018 A1 | 5/2011 | Narsinh et al. |
| 2011/0135013 A1 | 6/2011 | Wegener |
| 2011/0138064 A1 | 6/2011 | Rieger et al. |
| 2011/0178943 A1 | 7/2011 | Motahari et al. |
| 2011/0213688 A1 | 9/2011 | Santos et al. |
| 2011/0219229 A1 | 9/2011 | Cholas et al. |
| 2011/0265116 A1 | 10/2011 | Stern et al. |
| 2011/0283311 A1 | 11/2011 | Luong |
| 2012/0005527 A1 | 1/2012 | Engel et al. |
| 2012/0011567 A1 | 1/2012 | Cronk et al. |
| 2012/0030363 A1 | 2/2012 | Conrad |
| 2012/0124606 A1 | 5/2012 | Tidwell et al. |

FOREIGN PATENT DOCUMENTS

| | | |
|---|---|---|
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-2005015422 A1 | 2/2005 |
| WO | WO-2012021245 A1 | 2/2012 |

OTHER PUBLICATIONS

Denning, et al., Cryptography and Data Security, Addison-Wesley Publishing Company, ISBN 0-201-10150-5, 1982, pp. 62.

DLNA (Digital Living Network Alliance) protocols described in DLNA Networked Device Interoperability Guidelines Expanded, Mar. 2006 and subsequent expanded version dated Oct. 2006.

UTF-32, IBM, retrieved from http://publib.boulder.ibm.com/infocenter/iseries/v5r3/index.jsp?topic=%2FnIs%2Frbagsutf32.htm on Aug. 28, 2013.

\* cited by examiner

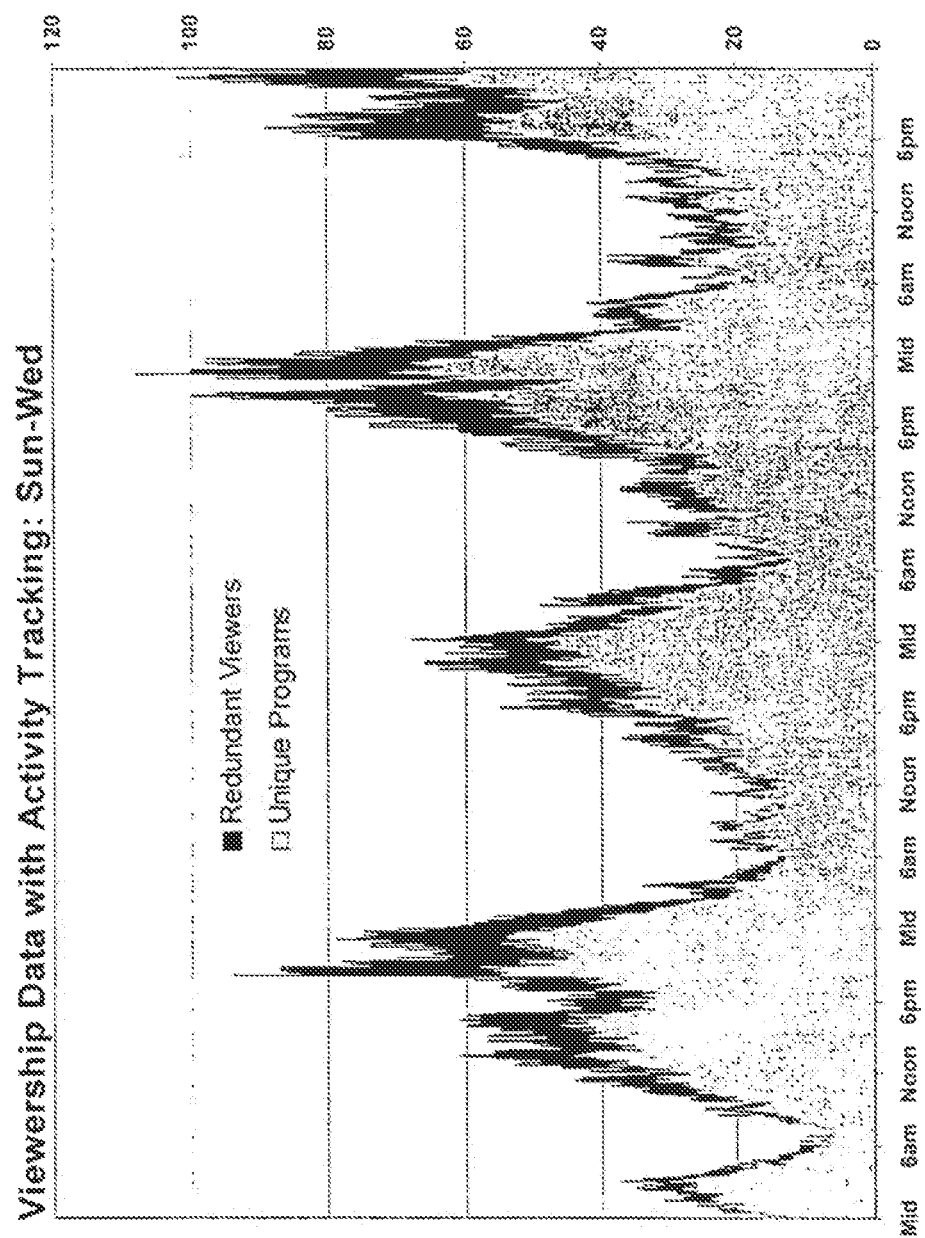

SOURCE TABLE - TUNER USAGE INFORMATION

| UID | CHANNEL ID | DATE | TIMESTAMPIN | TIMESTAMPOUT | TIMEONCHANNEL | SERVICE GROUP |
|---|---|---|---|---|---|---|
| 405E2655A601-1 | 125 | 1/1/2005 | 1:00 | 1:30 | :30 | 1256 |
| 808DE955730A-1 | 135 | 1/1/2005 | 5:00 | 10:00 | 5:00 | 1234 |
| B7E62655210F-1 | 180 | 1/1/2005 | 12:00 | 12:10 | :10 | 1244 |
| B8AC7E55A601-1 | 156 | 1/1/2005 | 8:00 | 9:00 | 1:00 | 1256 |
| CA368E557B40-1 | 165 | 1/1/2005 | 7:00 | 10:00 | 3:00 | 1289 |
| CA5E7C557B40-1 | 175 | 1/1/2005 | 6:00 | 6:25 | :25 | 1275 |
| D166EC557B40-1 | 132 | 1/1/2005 | 3:00 | 4:30 | 1:30 | 1244 |
| E88C6955730A-1 | 184 | 1/1/2005 | 4:00 | 5:10 | 1:10 | 1256 |

Fig. 2a

SOURCE TABLE - TARGET ID INFORMATION

| TARGET ID | SOURCE ID | TYPE |
|---|---|---|
| 456 | AD12 | ADVERTISEMENT |
| 457 | AD13 | ADVERTISEMENT |
| 458 | AD14 | ADVERTISEMENT |
| 459 | AD15 | ADVERTISEMENT |
| 700 | SID45 | PROGRAM STREAM |
| 701 | SID46 | PROGRAM STREAM |
| 702 | SID47 | PROGRAM STREAM |

Fig. 2b

*Cross Reference Table - Unique ID Target Data*

| Unique Tuner ID | ZIP+4 | Service Level | Field 1 Income | Field 2 Status | Field 3 etc... | Field 4 etc... | Field 5 etc... | Field 6 etc... | Field 7 etc... | Field 8 etc... |
|---|---|---|---|---|---|---|---|---|---|---|
| 405E2655A601-1 | 11957-2004 | Gold | 40,000-50,000 | S | | | | | | |
| 9080E85730A-1 | 11957-1678 | Silver | 100,000-125,000 | M | | | | | | |
| B7E6265J10F-1 | 11957-5546 | Platinum | 80,000-90,000 | MC | | | | | | |
| B9AC7E55A801-1 | 11957-8895 | Silver | 30,000-40,000 | DC | | | | | | |
| CA388E557B40-1 | 11957-2004 | Silver | 20,000-30,000 | D | | | | | | |
| CA5E7C557B40-1 | 11957-6533 | Gold | 80,000-90,000 | S | | | | | | |
| D186EC557B40-1 | 11957-5463 | Platinum | 60,000-70,000 | M | | | | | | |
| E08C8085730A-1 | 11957-5435 | Platinum | 100,000-125,000 | S | | | | | | |

Fig. 2c

*Cross Reference Table - Conditional Target Criteria*

| Conditional 1 | IF [ZIP+4]=11957-2004, THEN [TARGET]=457 |
|---|---|
| Conditional 2 | IF [INCOME]>1000 AND [CHID]=667 AND [TIMEONCHANNEL]>4:00:00, THEN [TARGET]=459 |
| Conditional 3 | IF [STATUS]=S, THEN [TARGET]=700 |
| Conditional 4 | |
| Conditional 5 | |
| Conditional 6 | |
| Conditional 7 | |
| Conditional 8 | |

Fig. 2d

METHOD AND APPARATUS FOR BOUNDARY-BASED NETWORK OPERATION

PRIORITY

This application is a divisional of and claims priority to co-owned, co-pending U.S. patent application Ser. No. 11/186,452 filed Jul. 20, 2005 of the same title, incorporated herein by reference in its entirety.

BACKGROUND OF THE INVENTION

1. Field of Invention

The present invention relates generally to the field of network service and content delivery and utilization, and specifically in one aspect to accurately delivering such services and content to particular subsets or groupings within the subscriber base of a cable television network.

2. Description of Related Technology

Selective "targeting" and delivery of content to subscribers in a cable network is generally well known in the prior art. For example, it may be desirable to include certain types of advertising at specific demographic or geographic segments of an MSO's subscriber base. These prior art approaches typically utilize a traditional (i.e., non-switched or cable system architecture. Specifically, in a typical U. S. cable system, downstream RF channels used for transmission each occupy a 6 MHz spectral slot in the available bandwidth (i.e., between approximately 54 MHz and 870 MHz). As previously noted, deployments of the next-generation services (e.g., VOD, HD broadcast/simulcast, PVR/DVR) have to share this spectrum with already established analog and digital cable television services including SD broadcasts. For this reason, the exact RF channel used for a given service may differ from plant to plant. However, within a given cable plant, all homes that are electrically connected to the same cable feed running through a neighborhood will receive the same downstream signal. For the purpose of managing services, these homes are grouped into logical aggregations or clusters typically called Service Groups. Homes belonging to the same Service Group receive their services (e.g., broadcast or VOD service) on the same set of RF channels.

This architecture, however, is generally not optimal for the delivery of targeted content, or enforcement of geographic or logical boundaries, since inter alia the level of granularity that can be achieved is very low (i.e., there is a lack of precision). Geographic boundaries are not precise, and often do not overlap well with the network distribution configuration. Accordingly, it is often impossible for network operator to draw precise lines of demarcation between different subsets or groups of its viewers. As a simple case, consider where an operator wishes to deliver particular content to all of the residents of Town X. Depending on where Town X is situated in proximity to its neighbors, its residents may be served by multiple different distribution nodes or hubs of a cable system. Or, certain portions of the Town may be serviced by one system operator, and other portions by another. This leads to very crude and imprecise delivery of content, with a potentially significant rate of error (error here being defined as instances where content should have been delivered to a particular premises but wasn't, or alternatively should not have been delivered but was).

Furthermore, many prior art targeting or boundary enforcement techniques are based on the concept of insertion of content rather than switching. Specifically, an existing content stream has the desired content spliced into or inserted within the stream before delivery to the subscribers. This approach requires significant processing overhead and complexity, due largely to the fact that precise timing relationships must be known and preserved, lest the subscriber perceive noticeable discontinuities or inconsistencies in programming flow.

A number of different approaches to geographic/boundary enforcement and targeted content delivery (including those described above) are evidenced prior art. For example, U.S. Pat. No. 5,988,078 to Levine issued Nov. 23, 1999 entitled "Method and apparatus for receiving customized television programming information by transmitting geographic location to a service provider through a wide-area network" discloses a personal computer that assists in the selection of television programs to be recorded at future times, and controls a video tape recorder to implement the selected recordings. An application program allows the computer to receive data representing a schedule of future programs. The operator can perform data base operations on the data to obtain listings of programs of particular interest. A program to be recorded is selected by moving a cursor into position with the display of the program listing on the computer. An output device generates infrared signals to control the video tape recorder and a cable box to tune and record a selected program.

U.S. Pat. No. 6,029,045 to Picco, et al. issued Feb. 22, 2000 entitled "System and method for inserting local content into programming content" discloses a system for communicating a programming data stream and a data stream containing pieces of local content data that are going to be inserted into a local content space in the programming data stream at some predetermined time. The programming data stream and the local content digital data stream are transmitted to a set-top box in a house of a user, the set-top box stores a predetermined portion of the pieces of local content data based on predetermined criteria, and the set-top box identifies a local content space in the programming data stream. The set-top box may also select a particular piece of local content from the storing system to insert into the local content space in the programming data stream based on a plurality of predetermined preferences of the user, retrieve that selected piece of local content from said storage means, and insert that selected piece of local content into said programming data stream at said local content space so that individualized local content specific to the user of the set-top box is inserted into the programming data stream.

U.S. Pat. No. 6,052,145 to Macrae, et al. issued Apr. 18, 2000 entitled "System and method for controlling the broadcast and recording of television programs and for distributing information to be displayed on a television screen" discloses a system for providing programming and other information to television viewers for enabling them to control their respective television receivers. A central broadcasting computer and associated memory gathers and stores the information to be provided, and broadcasts it in a viewing area. An information receiver positioned in close proximity to the television is linked to said central broadcasting computer to receive signals representing said information from said central broadcasting computer. The received signals are converted video displays viewable on the television receiver's screen, and the user can use the displays to control the television receiver and other devices, such as video cassette recorders, used with the television receiver.

U.S. Pat. No. 6,088,722 to Herz, et al. issued Jul. 11, 2000 entitled "System and method for scheduling broadcast of and access to video programs and other data using customer profiles" discloses a system and method for scheduling the receipt of desired movies and other forms of data from a network, which simultaneously distributes many sources of such data to many customers, as in a cable television system. Customer profiles are developed for the recipient describing how important certain characteristics of the broadcast video program, movie, or other data are to each customer. From these profiles, an "agreement matrix" is calculated by comparing the recipient's profiles to the actual profiles of the characteristics of the available video programs, movies, or other data. The agreement matrix thus characterizes the attractiveness of each video program, movie, or other data to each prospective customer. "Virtual" channels are generated from the agreement matrix to produce a series of video or data programming which will provide the greatest satisfaction to each customer. Feedback paths are also provided so that the customer's profiles and/or the profiles of the video programs or other data may be modified to reflect actual usage, and so that the data downloaded to the customer's set top terminal may be minimized. Kiosks are also disclosed which assist customers in the selection of videos, music, books, and the like in accordance with the customer's objective profiles. See also U.S. Pat. No. 5,758,257.

U.S. Pat. No. 6,133,910 to Stinebruner issued Oct. 17, 2000 entitled "Apparatus and method for integrating a plurality of video sources" discloses a video system utilizing a "virtual tuner" that integrates signals from multiple video sources to provide a plurality of "virtual channels", each of which has both a video source and a channel associated with it. When a virtual channel is selected, the correct video source is selected and tuned to the correct channel automatically. The virtual tuner may be embodied in a television or in a separate electronic component coupled thereto, such as a direct broadcast satellite receiver. Alternatively, the video system may be embodied in a universal remote control which is capable of outputting multiple signals to multiple devices in response to a key depression, using either one or two signal transmitters. Channel information may also be downloaded or obtained from a database, for example, to customize an electronic component to receive local broadcast channels.

U.S. Pat. No. 6,252,634 to Yuen, et al. issued Jun. 26, 2001 entitled "Method and apparatus for transmitting and downloading setup information" discloses multiple channel maps that are embedded in a television transmission. The appropriate channel map corresponding to the particular television service used by the viewer is downloaded for use with the television receiver. Each channel map is accompanied by a channel map identifier which identifies the source of the television transmission and geographic identifier. The source of a television transmission is automatically detected by monitoring the radio-frequency spectrum allocations of telecast stations. The geographic area identifier is determined by comparison with a user inputted geographic area identifier. The channel map having a channel map identifier corresponding to the detected television transmission source and the user-input geographic area identifier is downloaded and stored for future use. See also U.S. Patent Application Publication No. 20030213001.

U.S. Pat. No. 6,446,261 to Rosser issued Sep. 3, 2002 entitled "Set top device for targeted electronic insertion of indicia into video" discloses a method of ostensibly anonymous targeted insertion of indicia into video broadcasts. Individual televisions or other video reception devices are associated with set-top boxes that monitor the usage and viewing habits of the television set or other video reception device. A viewer profile derived from data acquired from said monitoring is created wherein the viewer profile indicates certain characteristics about the viewer. This profile is transmitted to a centralized database, the centralized database being an intermediate link between the origin of the video broadcast and the end viewer. The purpose of the database is to link specific insertable indicia with matching specific viewer profiles. The insertable indicia are encoded directly into the broadcast video and re-broadcast to the end viewer where the set-top box decodes the broadcast video and performs insertion of the indicia. Thus, the system and method allow advertisers to target specific ads or indicia to specific viewing profiles.

U.S. Pat. No. 6,463,585 to Hendricks, et al. issued Oct. 8, 2002 entitled "Targeted advertisement using television delivery systems" discloses a multiple channel architecture designed to allow targeted advertising directed to television terminals connected to an operations center or a cable headend. Program channels carry television programs. During commercial breaks in the television programs, advertisements, which are also broadcast on the program channel, are displayed. However, additional feeder channels carry alternate advertising that may be better suited for certain viewing audiences. The operations center or the cable headend generate a group assignment plan that assigns the television terminals to groups, based on factors such as area of dominant influence and household income. A switching plan is then generated that instructs the television terminals to remain with the program channel or to switch to one of the alternate feeder channels during the program breaks. The television terminals record which channels were viewed during the program breaks, and report this information to the cable headends and the operations center. The reported information is used to generate billing for commercial advertisers, and to analyze viewer watching habits. The invention uses upstream data reception hardware, databases and processing hardware and software to accomplish these functions.

U.S. Pat. No. 6,539,548 to Hendricks, et al. issued Mar. 25, 2003 entitled "Operations center for a television program packaging and delivery system" discloses an Operations Center for television entertainment systems that provide television programming to consumer homes is disclosed. The Operations Center organizes and packages television programming and program information for delivery to and from consumer homes. The Operations Center includes a computerized packaging system for creating a program control information signal.

U.S. Pat. No. 6,728,269 to Godwin, et al. issued Apr. 27, 2004 entitled "Device and method for efficient delivery of redundant national television signals" discloses a method and apparatus of broadcasting that has a geographic identifier memory, an overlay memory storing an overlay, a receiver circuit for receiving a broadcast signal and a control circuit. The control circuit displays the overlay on the broadcast signal in response to the geographic identifier.

U.S. Pat. No. 6,760,537 to Mankovitz issued Jul. 6, 2004 entitled "Apparatus and method for television program scheduling" discloses a method of tuning television programs using a television tuner involving establishing a communications link between a user of a television tuner and database of television schedule information. The database is located at a site remote from the user. The user communicates program selection criteria to the remote site. A database of television schedule information is searched based on the program selection criteria and program identification data is derived from the database, the program identification data corresponding to television programs meeting the program selection criteria. The program identification data is transmitted over the communications link to a television tuner controller.

U.S. Pat. No. 6,785,904 to Franken, et al. issued Aug. 31, 2004 entitled "Method and system for providing household level television programming information" discloses a computer and internet-based system and method for providing television and radio programming information and channel assignments to users, which is based upon a household level determination of a location of the user.

U.S. Pat. No. RE38,600 to Mankovitz issued Sep. 28, 2004 entitled "Apparatus and methods for accessing information relating to radio television programs" an apparatus and method for ordering supplemental information about programs playing at a broadcast receiver. The method includes reproducing programs from one of a plurality of stations, recording an identification of a station and a time of a program, entering this information into one of a plurality of terminals, coupling the terminal to a depository and identifying a correspondence between the entered station identification and time and a program in a station log to obtain the desired supplemental information.

U.S. Pat. No. 6,799,326 to Boylan, III, et al. issued Sep. 28, 2004 entitled "Interactive television program guide system with local advertisements" discloses a program guide system in which local advertisements may be distributed to interactive television program guides implemented on the user television equipment associated with a television distribution facility such as a cable system headend. The local advertisements contain information that is directed toward the particular users in a local area. The local advertisements may be displayed when a user selects a related global advertisement. The local advertisements may also be displayed automatically by cycling global advertisements and local advertisements. Advertisements may be blocked based on content or time shifted. Policies regarding advertisement usage may be enforced.

U.S. Patent Application Publication No. 20020078444 to Krewin, et al. Jun. 20, 2002 entitled "System and method for the scaleable delivery of targeted commercials" discloses a system for the delivery of targeted advertising wherein a viewer profiling system distributes view profile data to control devices. Insertion orders are broadcast to the control devices or and the control devices store selected insertion orders based on the profile data. Broadcast commercials are displayed according to the acquisition field of the stored insertion orders.

U.S. Patent Application Publication No. 20020087976 to Kaplan, et al. published Jul. 4, 2002 entitled "System and method for distributing video with targeted advertising using switched communication networks" discloses a system and method for delivering broadcast-quality video with targeted advertising to viewers over the switched communication network. According to one embodiment, program streams with appropriately inserted splice points are transmitted from a network head end node to one or more egress nodes via a switched network. Demographically-targeted advertising is then inserted into the program streams at the egress nodes for subsequent delivery to individual subscribers. More specifically, targeted advertising is inserted in a program stream using a splicing method that employs adaptive synchronization to align splice points in the program and advertising streams that are being spliced together. Because the switched network only carries program streams while advertising is inserted at the edges of the network, programs with demographically-targeted advertising can be delivered to many different subscribers without the need for using the bandwidth of the switched network to carry a unique program and advertising stream for each demographic group from the head end node. In one embodiment, the mechanism for delivery to the viewer's home or corporate office is via existing copper (e.g., twisted pair) or fiber-to-the-home (FTTH) using xDSL or Ethernet access technologies and the like.

U.S. Patent Application Publication No. 20020123928 to Eldering, et al. published Sep. 5, 2002 entitled "Targeting ads to subscribers based on privacy-protected subscriber profiles" discloses the monitoring subscriber viewing interactions, such as television viewing interactions, and generating viewing characteristics therefrom. At least one type of subscriber profile is generated from at least some subset of subscriber characteristics including viewing, purchasing, transactions, statistical, deterministic, and demographic. The subscriber characteristics may be generated, gathered from at least one source, or a combination thereof. Groups of subscribers are formed by correlating at least one type of subscriber profile. The subscriber groups may correlate to elements of a content delivery system (such as head-ends, nodes, branches, or set top boxes (STBs) within a cable TV system). Advertisement profiles are correlated to subscriber/subscriber group profiles, and targeted advertisements selected for the subscribers/subscriber groups based on the correlation. The targeted advertisements are inserted in place of default ads in program streams somewhere within the content delivery system (head-end, node, or STB), and presented to the subscriber/subscriber group via a television.

U.S. Patent Application Publication No. 20030028888 to Hunter, et al. issued Feb. 6, 2003 entitled "Systems and methods for providing consumers with entertainment content and associated periodically updated advertising" discloses a player device for generating audio visual signals representative of entertainment content with advertisements. The device includes a reader mechanism for reading entertainment content pre-recorded on a first medium and reading advertisements pre-recorded on a second medium, and a processor generating command signals inserting advertisements read by the reader mechanism from the second medium into entertainment content read by the reader mechanism from the first medium.

U.S. Patent Application Publication No. 20030126611 to Chernock, et al. published Jul. 3, 2003 entitled "Methods and apparatus for controlling interactive television information and commerce services" discloses an apparatus for an interactive television commerce environment, acting as a central point of control and information for enabling and facilitating information distribution and transactions in this environment. The apparatus is an element of an interactive television (ITV) commerce system, and enables the introduction of interactive commerce services in cable, satellite, and other broadcast networks. Other services provided include interfacing with off-line interactive advertisements, historical review and tracking services for users, and providing feedback and ITV ad modification capabilities to advertisers. The apparatus, residing at a local head end, can also add to or modify ads by inserting content of local relevance.

U.S. Patent Application Publication No. 20030221191 to Khusheim published Nov. 27, 2003 entitled "System and method for directed television and radio advertising" discloses a method and a device that selects a commercial message for presentation based on user profile criteria. A programming content signal is received at a customer premises equipment (CPE). A stored commercial message is selected for presentation during presentation of the programming content signal. The selected commercial message contains summary information related to an informational content of the selected commercial message, and is selected based on the summary information contained by the selected commercial message. Each selected commercial message is then presented during the programming content signal by inserting each selected commercial message into the received programming content signal by presenting the selected commercial message in place of the programming content signal. Information relating to each commercial message presented and/or an interaction with a user can be recorded and sent to a central location.

U.S. Patent Application Publication No. 20040226043 to Mettu, et al. published Nov. 11, 2004 entitled "Location enabled television" discloses a method, apparatus, and article of manufacture that provide the ability to display personalized information on a television. A server obtains viewer-based information. The server then obtains customized information that is customized based on the viewer-based information. Audio/video information is then multiplexed with the customized information and broadcast using a satellite/cable, etc. The broadcast multiplexed information is received in a set top box (e.g., by a location logic application). The set top box causes the customized information to be displayed on a television communicatively coupled to the set top box.

Another significant issue with targeting and boundary enforcement within a subscriber network is the need to maintain complete privacy and anonymity for individual subscribers from which the targeting or geographic/demographic/psychographic information is obtained. Subscribers generally demand complete privacy regarding their viewing habits, type of content viewed, etc. Hence, any commercially practical system must maintain complete privacy. In other types of network paradigms (such as video-on-demand, or VOD), the subscriber's identity and tuner location is essential to instantiating and delivering the requested content, providing "trick mode" functions, billing the correct subscriber, etc. Furthermore, VOD is not a broadcast paradigm, and hence individual streams must be instantiated and generated for each subscriber, adding significant infrastructure and processing overhead.

Hence, based on the foregoing, there is a distinct need for improved apparatus and methods that permit the precise and efficient enforcement of geographic, demographic, psychographic, or other logical boundaries within the broadcast subscriber base of a network operator, as well as precise targeting of certain content and advertising to portions of the subscriber base. Such improved apparatus and methods would ideally take advantage of and leverage the efficiencies provided by a switched broadcast architecture (in contrast to a narrowband or VOD approaches), including bandwidth conservation. Mechanisms to implement different types of operational and/or business rules would also be provided.

SUMMARY OF THE INVENTION

The present invention satisfies the foregoing needs by providing improved apparatus and methods for targeted content delivery and physical and/or logical boundary enforcement, such as may be used in a cable or satellite network.

In a first aspect of the invention, a method of operating a content-based network is disclosed. In one embodiment, the network comprises a broadcast switched architecture (BSA) with at least one server and a plurality of consumer premises equipment (CPE) in direct or indirect signal communication therewith, and the method comprises: providing each of the CPE with a parameter; correlating the first parameter with a second parameter; and selectively delivering content to individual ones of the CPE based at least in part on the act of correlating.

In one exemplary variant, the first parameter comprises an identification value unique to the CPE (or individual tuner thereof), and the second parameter comprises a postal zip code, and the act of selectively delivering comprises selectively delivering first content to the CPE disposed within a first zip code. The CPE identification comprises a MAC address, which is cryptographically hashed so as to prevent determining the identity or location of the tuner/CPE from the hashed value.

In another variant, the first parameter comprises an identification value unique to the CPE, and the second parameter comprises a parameter selected from the group consisting of: (i) telephone area code, and (ii) telephone exchange, and the act of selectively delivering comprises selectively delivering first content to the CPE disposed within the area code or exchange.

In a second aspect of the invention, a method of selectively delivering targeted content to individual ones or subsets of a plurality of CPE of a selectively switched content-based broadcast network comprising at least one server disposed at a hub of the network is disclosed. In one embodiment, the method comprises: providing each of the CPE with an identification parameter; generating a correlation between the identification parameter and a second parameter associated with the each CPE or its subscriber; disposing the correlation at the server; receiving at the server a request from one of the plurality of CPE for content; determining, based at least in part on the correlation, one of a plurality of content to be delivered to the requesting one of the CPE; and delivering the one content to the requesting one of the CPE.

In a third aspect of the invention, CPE adapted for use within a cable network is disclosed. In one embodiment, the CPE comprises: an interface configured to receive encoded content signals from the network; processing apparatus operatively coupled to the interface and adapted to decode the encoded signals received via the interface; and at least one computer program running on the CPE, the at least one program being adapted to generate an upstream request for at least one program channel for transmission to a server entity of the network, the upstream request being configured to cause the server entity to selectively switch certain content to the CPE. The CPE further comprises a unique identification parameter, the parameter being at least part of the basis for the selective switching by the server entity.

In one variant, the network comprises a broadcast switched architecture (BSA) network, and the computer program is downloaded to the CPE at runtime (or pre-positioned on the CPE and accessed at boot-up). The upstream request from the CPE is generated only if the requested program channel is not currently being delivered to the CPE. The upstream request includes a MAC address, which may be passed "in the clear" or alternatively cryptographically hashed before it is sent upstream.

In another variant, the interface comprises an RF tuner having wideband tuner apparatus adapted to receive the encoded content signals over a plurality of the carriers in substantially simultaneous fashion.

In a fourth aspect of the invention, a network server apparatus for use in a network is disclosed. In one embodiment, the network comprises a cable television network having a plurality of CPE, and the apparatus comprises: a processor adapted to run at least one computer program thereon; a storage device in data communication with the processor, the storage device being adapted to store a plurality of data relating to individual ones of the CPE; and a computer program adapted to selectively switch one of a plurality of content options to groups of ones of the plurality of CPE based at least in part on the plurality of data relating to individual ones of the CPE. In one variant, the network comprises a broadcast switched architecture, and the selective switching is based on a correlation between an identifier (ID) of each of the CPE and (i) its geographic location, or (ii) at least one demographic associated with the subscriber operating the CPE.

In a fifth aspect of the invention, a method of anonymously and selectively providing content to a plurality of subscribers of a network is disclosed. In one embodiment, the network content-based network comprising at least one server and a plurality of consumer premises equipment (CPE) in direct or indirect signal communication therewith, and the method comprises: providing each of the CPE with an identifying parameter; correlating the identifying parameter with a second parameter; and selectively delivering content to individual ones of the CPE based at least in part on the act of correlating. In this embodiment, the identity of the subscribers is not utilized (and not discoverable) as part of the acts of correlating or delivering.

In a sixth aspect of the invention, a method of enforcing a geographic or logical boundary within a broadcast switched architecture (BSA) network is disclosed. In one embodiment, the BSA network comprises at least one server and a plurality of consumer premises equipment (CPE) in communication therewith, the plurality of CPE each having an identification parameter associated therewith, and the method comprises: correlating the identification parameter for at least a portion of the plurality of CPE with a second parameter relating to a first geographic location of, or a logical relationship between a given CPE and others of the at least portion; and selectively delivering content to individual ones of the CPE having the geographic location or the logical relationship. The method further comprises receiving a request from at least one of the plurality of CPE to switch to a given program channel; and wherein the act of selectively delivering comprises selectively choosing and delivering one of a plurality of possible broadcast content options over the requested program channel based at least in part on the request and the act of correlating.

In a seventh aspect of the invention, a method of doing business within a content-based network is disclosed. In one embodiment, the network comprises at least one server and a plurality of consumer premises equipment (CPE) in direct or indirect signal communication therewith, and the method comprises: providing services to a plurality of subscribers associated with respective ones of the plurality of CPE; providing each of the CPE with an identifying parameter; gathering data relating to the subscribers or the CPE; correlating the identifying parameter with the data; selectively choosing broadcast content for delivery to individual ones of the CPE based at least in part on the data and the identifying parameter; and delivering the chosen content to the individual ones of the CPE. The identity of the subscribers is optionally not utilized (or discoverable) as part of the acts of correlating, choosing, or delivering.

In an eighth aspect of the invention, a method of providing network services to one or more users of a content-based network is disclosed. In one embodiment, the method comprises: generating data at a first location; transmitting the data in a first direction within the network to a network node; replicating at least portions of the data via the node; and transmitting at least portions of the replicated data to at least one user of the network. In one variant, the network comprises a broadcast switched architecture (BSA) network having a plurality of hubs, the hubs being utilized to selectively switch a subset of all content available on the network to the users. Video signals or other sensor data are generated at local sites, and passed upstream toward the hub(s), which replicate the data and selectively switch it back to certain ones of the subscriber pool using, e.g., the boundary enforcement and targeting methods previously described.

BRIEF DESCRIPTION OF THE DRAWINGS

FIG. 1d is a graphical illustration of exemplary redundant viewership data associated with a typical implementation of a broadcast switched architecture (BSA).

FIGS. 2a-2d are graphical representations of exemplary source and correlation table data structures useful with the present invention.

DETAILED DESCRIPTION OF THE INVENTION

Figure 1:
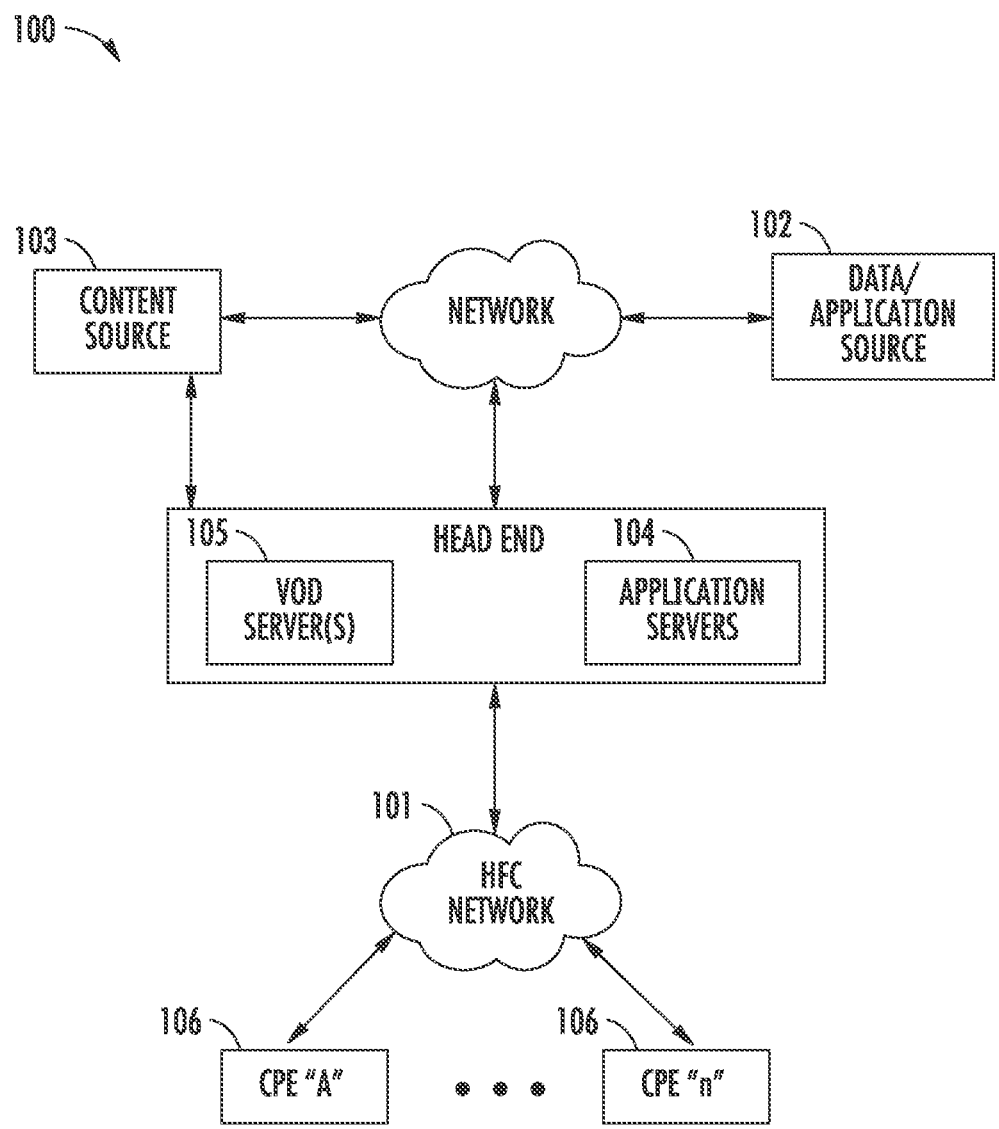
FIG. 1 is a functional block diagram illustrating an exemplary HFC cable network configuration useful with the present invention.

Reference is now made to the drawings wherein like numerals refer to like parts throughout.

As used herein, the terms "user channel" and "program channel" are all generally synonymous with the concept of a perceived stream of information. For example, a program/ user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "QAM" refers to modulation schemes used for sending signals over cable networks. Such modulation scheme might use any constellation level (e.g. QAM-16, QAM-64, QAM-256 etc.) depending on details of a cable network. A QAM may also refer to a physical channel modulated according to the schemes.

As used herein, the term "Service Group" refers to either a group of service users (e.g. subscribers) or the resources shared by them in the form of entire cable RF signals, only the RF channels used to receive the service or otherwise treated as a single logical unit by the network for resource assignment.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/6XXX/8XXX series digital devices, personal digital assistants (PDAs) such as the Apple Newton®, "Palm®" family of devices, handheld computers, personal communicators such as the Motorola Accompli or V710, J2ME equipped devices, cellular telephones, wireless nodes, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "component" in the context of software refers generally to a unit or portion of executable software that is based on a related set of functionalities. For example, a component could be a single class in Java™ or C++. Similarly, the term "module" refers generally to a loosely coupled yet functionally related set of components.

As used herein, the term "server" refers to any computerized component, system or entity regardless of form which is adapted to provide data, files, applications, content, or other services to one or more other devices or entities on a computer network.

As used herein, the term "boundary" refers to, without limitation, any actual, geographic, logical, or virtual boundary or implementation rule as specified by one or more criteria. For example, a geographic boundary may be specified by one or more postal zip codes, telephone area codes/exchanges, or the like. Alternatively, a logical boundary or rule may be specified by membership in an organization, subscription to a particular service, or the like.

Overview

The present invention comprises, inter alia, methods and apparatus for selectively enforcing one or more "boundary" conditions within a network (such as, e.g., a cable television network), as well as providing for very selective and targeted delivery of content, advertising, and data. This enforcement and targeting can advantageously be provided in a completely anonymous fashion.

In one aspect of the invention, a mechanism is provided whereby a network entity (e.g., the switching software of a cable network MSO) can determine one or more parameters or values associated with individual CPE (or groups of CPE), for purposes of, inter alia, content management and/or bandwidth or channel allocation. In one embodiment, the aforementioned determination is performed via a tabular reference table or similar data structure composed of a list of cryptographically hashed identifiers for CPE (including individual tuners within a given CPE) and their classification or logical grouping, as designated by specific criteria. For example, certain CPE may be grouped according to location, such as by postal zip code, school district or region, etc. Alternatively, CPE can be identified and classified according to demographic or logical groupings which may or may not relate to location, such as for example membership in certain organizations or subscription services, certain viewing habits, and so forth The exemplary software of the invention utilizes these values to enable or disable a service stream to that particular CPE/tuner (as well as potentially others sharing common traits or criteria), and/or provide other functionality. This overcomes the deficiencies in the prior art relating to the lack of highly selective delivery of content/services by providing a means to deliver select services or content over the HFC network to a highly targeted audience based on one or more service group parameters, all while maintaining complete anonymity of the subscribers. This anonymity is provided in the exemplary embodiment by, inter alia, use of the aforementioned cryptographic hash, coupled with an optional "opaque" variable which carries information relating to the CPE of the hash with which it is associated. The hash and opaque variable frustrate de-encryption or reverse-engineering of the individual subscriber's identity or specific location.

The present invention also advantageously overcomes the prior art disability of requiring an association with a physical network topology or architecture for providing targeted delivery and boundary enforcement; the approach of the present invention is substantially agnostic to the network topology, thereby allowing significant flexibility and use with multiple different networks.

The present invention finds particular utility in the context of so-called "broadcast switched architecture" (BSA) cable systems, for example allowing for boundary-based program/service delivery and targeted advertising via the installed infrastructure (e.g., hubs) of the BSA system. Notably, BSA systems make available to subscribers only selected program channels, as opposed to flooding each subscriber (and each portion of the network infrastructure) with all of the program channels furnished by the system, as in prior art content delivery networks. Specifically, the BSA network provides program channels on an as-needed basis using selective hub-based switching, these channels being selected to serve the subscribers in the same "neighborhood" requesting those channels. This approach allows for significant conservation of the finite bandwidth available in the network infrastructure.

The present invention also discloses the concept of intrinsic or "autonomous" intelligence within a switched network (such as the BSA network previously referenced). Specifically, the distribution server(s) used in the network can have knowledge of group membership, as well as other attributes relating to the group or individual CPE) without consulting any external or secondary sources such as billing or subscriber databases. This autonomous intelligence is also advantageously anonymous from the standpoint that the server's knowledge of this group membership (and other attributes) relies on no such external sources which specifically identify the subscriber(s). Rather, the only information used is the aforementioned hash (and opaque variable), neither of which allow personal description of a subscriber or their premises on a stored, retrievable basis.

Improved network server and CPE apparatus capable of implementing the aforementioned boundary enforcement and targeting methodologies are also described, as well as mechanisms to implement operational and/or business rules during system operation.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where boundary enforcement or control (or targeted service delivery) is required or desirable. Such other networks or architectures may be broadband, wired or wireless, content or data, or otherwise. Hence, the following description is merely exemplary in nature. For example, the invention may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is also noted that the present invention may be utilized with one or more service levels (e.g., SD or HD, or both). Alternatively, it is foreseeable that yet even higher levels of definition may be employed in the future (e.g., "ultra-high definition" or UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics. Hence, the invention is compatible with multiple bit rates and coder-decoders (codecs).

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

FIG. 1 illustrates a high-level diagram of a typical content-based network configuration with which the boundary enforcement/targeting methodologies of the present invention may be used. The various components of the network 100 include (i) one or more data and application origination points 102; (ii) one or more content or program sources 103; (iii) one or more application/data/content distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The content source 103 may comprise any indigenous (i.e., MSO) or third party provider of content, whether direct or indirect. This content may comprise an MPEG (e.g., MPEG-2) stream, or otherwise. The content may also pass through one or more intermediary nodes or conditioning process before transmission over the network 101, as is well understood in the art.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Such CPEs 106 comprise processors and associated computer memory adapted to store and run the downloaded or resident application, as well as receive the streamed in-band content. For example, "Watch TV" or similar applications or their components (or updates thereto) of the type described subsequently herein with reference to FIG. 6 can be downloaded to the CPE as required. For example, co-owned and co-pending U.S. patent application Ser. No. 10/655,655 filed Sep. 5, 2003 and entitled "Technique For Updating A Resident Application And Associated Parameters In A User Terminal Through A Communications Network", incorporated herein by reference in its entirety, describes one exemplary technique and architecture for updating applications resident on network CPE.

Figure 1A:
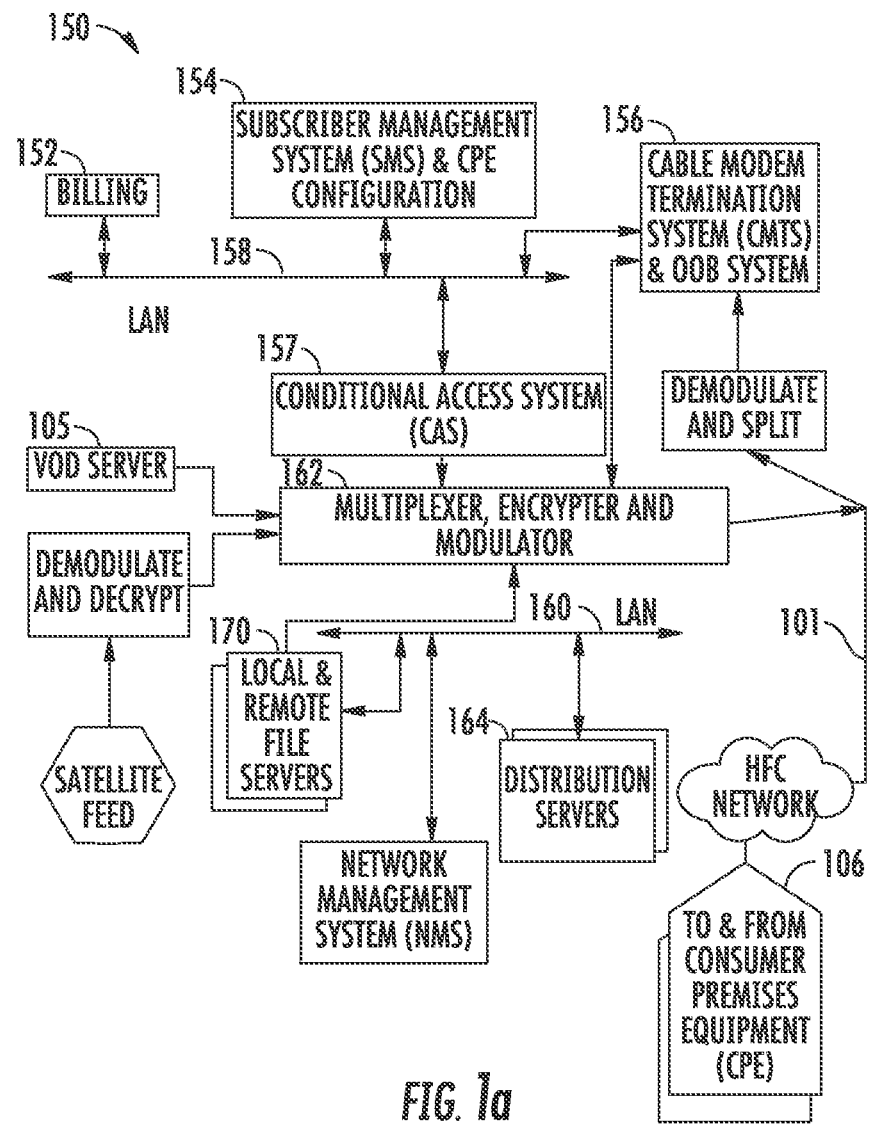
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these exemplary approaches.

In another embodiment, the network infrastructure includes one or more on-demand file or "carousel" functions. The present invention contemplates that not only will more traditional movie (e.g., MPEG) broadcast data be delivered though the boundary enforcement/targeting mechanisms described herein, but also data for interactive applications or other types of applications.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Broadcast Switched" Networks

Figure 1B:
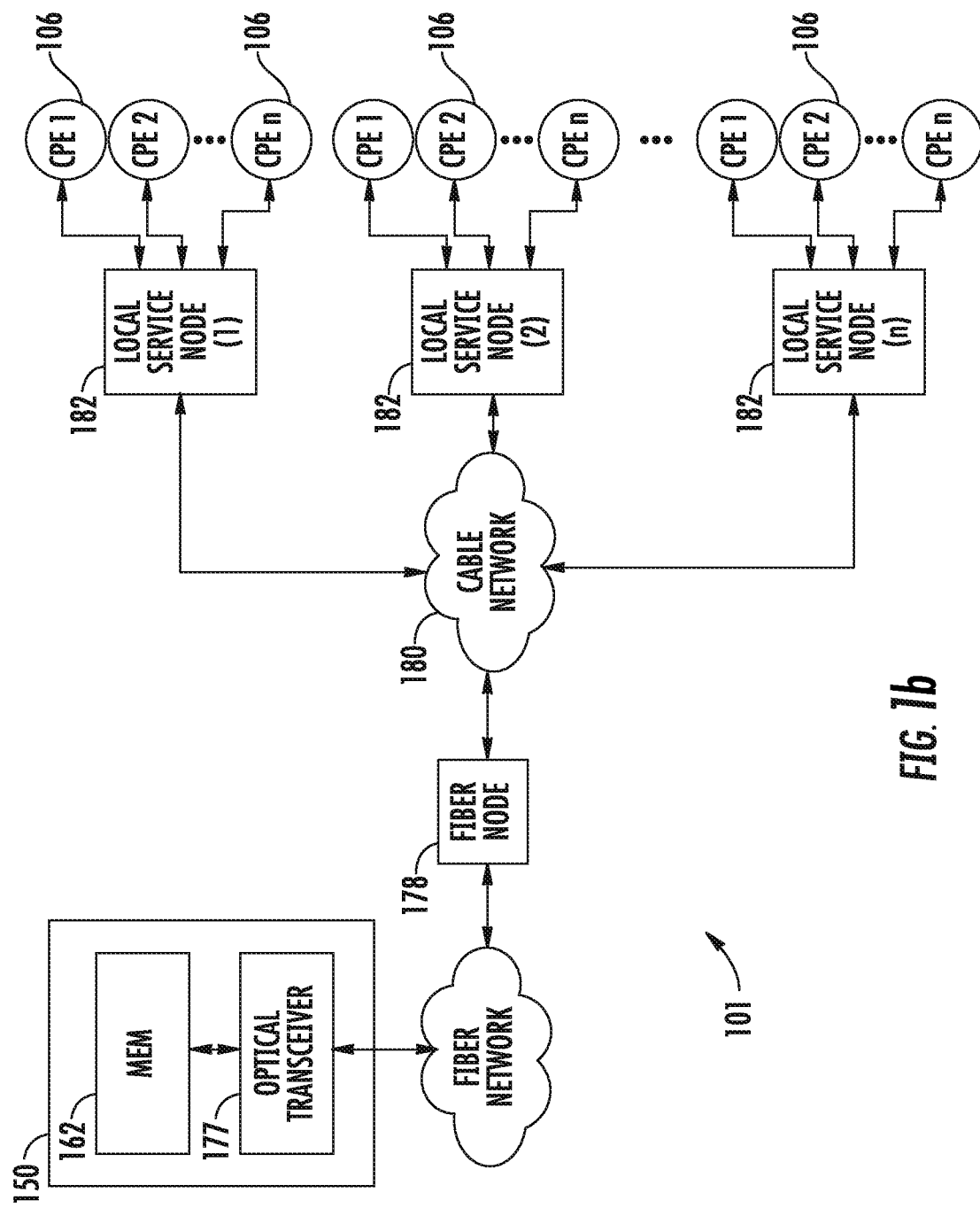
FIG. 1b is a functional block diagram illustrating one exemplary local service node configuration useful with the present invention.
Figure 1C:
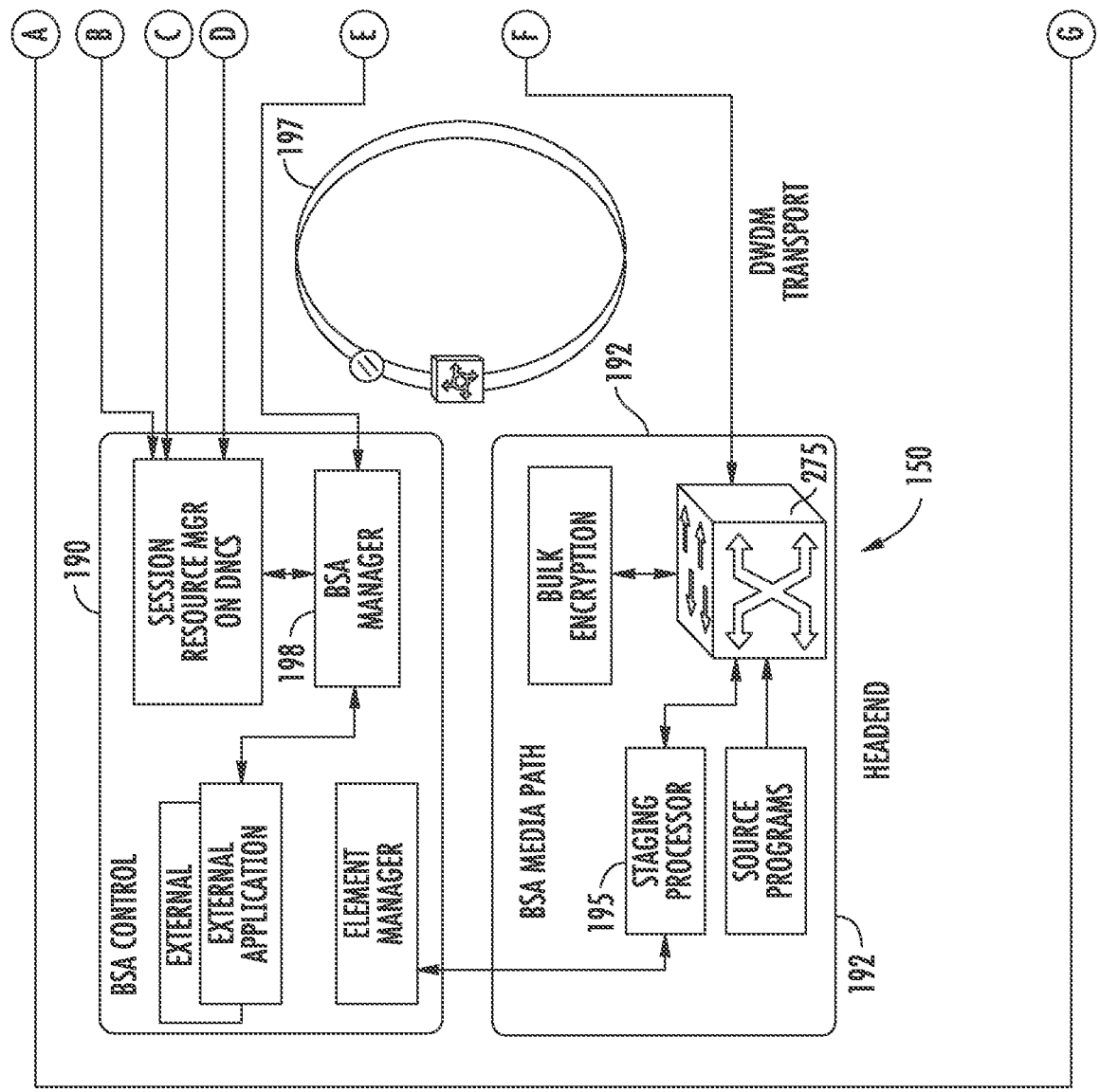
FIG. 1c is a functional block diagram illustrating one exemplary broadcast switched architecture (BSA) network useful with the present invention.
Figure 1C:
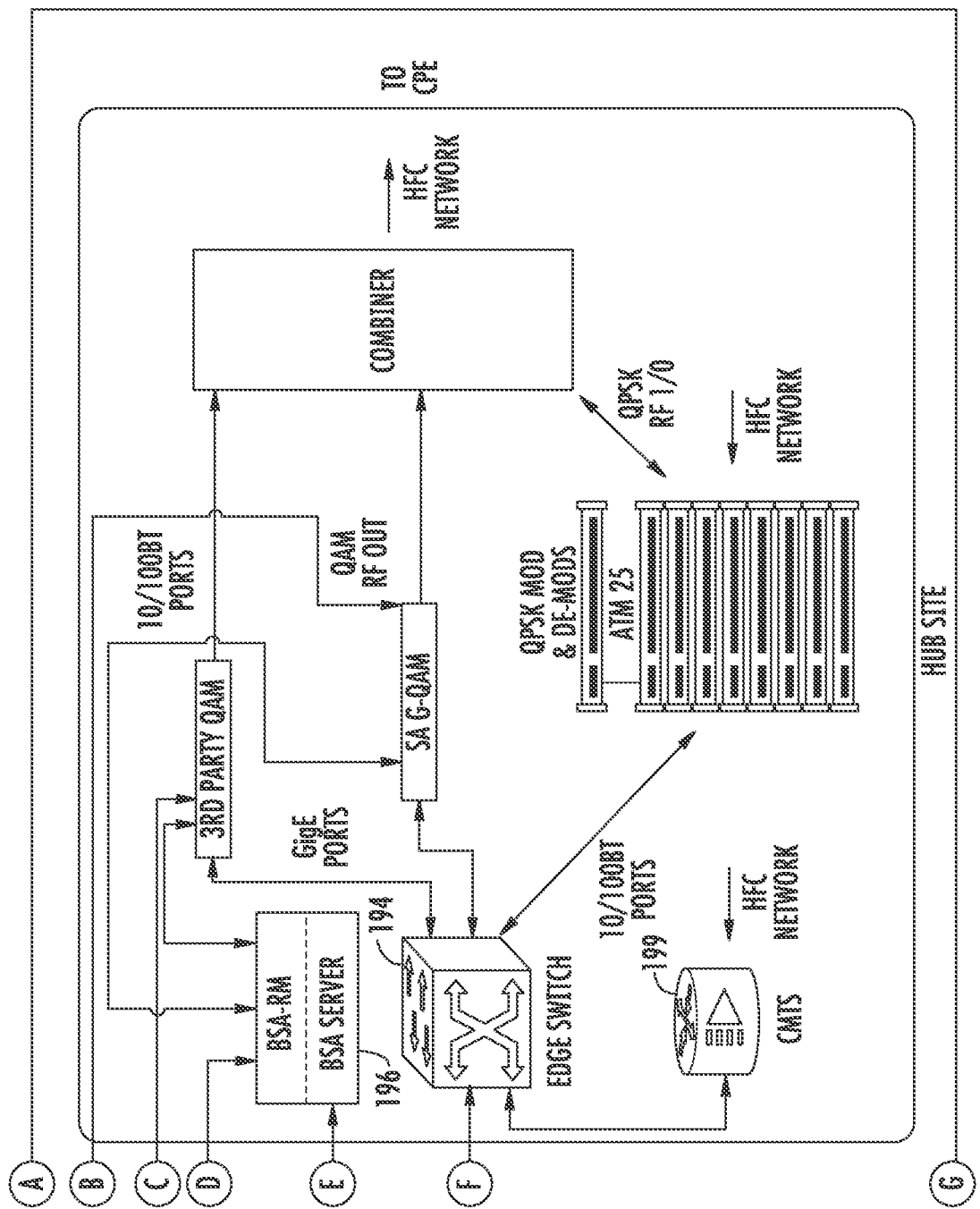

FIGS. 1b and 1c illustrate an exemplary "switched" network architecture useful with the present invention. Switching architectures allow improved efficiency of bandwidth use for ordinary digital broadcast programs. Ideally, the subscriber will be unaware of any difference between programs delivered using a switched network and ordinary streaming broadcast delivery.

Specifically, as shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

FIG. 1c shows the implementation details of one exemplary embodiment of this switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a BSA manager entity disposed at the head-end) as discussed subsequently herein. An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary switched architecture useful with the present invention, although it will be recognized by those of ordinary skill that other approaches and architectures may be substituted.

BSA programming may comprise, without limitation, simulcasts, interactive pay-per-view (IPPV), live sporting and other events, and other selected offerings. A set-top box (STB) or two-way Digital Cable Ready (e.g., CableCard) television is required for viewing.

In order for the BSA function to be transparent to the subscriber, channel change latencies must be kept to a minimum (e.g., 250 ms or less as compared to average linear digital broadcast services). Like video-on-demand (VOD) systems, BSA programs are streamed to a service group (contrast: switch) only when being viewed. Unlike VOD, many viewers can view the same stream. Typically, only real-time linear programs are included in BSA broadcasts. Since there is no storage involved, the "VCR" controls (e.g., trick mode functions) common to VOD are not available. In this regard, BSA is much simpler that VOD. Commercials or other programming segments cannot be skipped, and program bit rates are treated as in more conventional systems.

In the context of the aforementioned BSA network, there are several metrics or indices which are useful in evaluating the performance of the network. Specifically, the expression "peak streams" represents the maximum number of different program streams that are instantaneously (based on specified data intervals) needed as a worst case. Using software, CPE tuner addresses can be purposely or randomly assigned to service groups, and peak stream requirements can be analyzed for each group size. It has been noted by the Assignee hereof that generally speaking, as service group size is decreased, peak stream needs also decrease. When viewed over a sufficiently short time scale (e.g., two hour periods), it is possible to compare the moment-to-moment variability in peak stream use.

It has also been noted that the smaller service groups display roughly the same variability as the larger service groups. When considered as a percentage of maximum stream use, as service group size decreases, variability increases, and will impose a limit the amount of concentration that can be safely implemented within the system. Concentration in BSA is defined as a ratio of the total bandwidth of the programs offered, to the BSA bandwidth provided to the service group. While this is conveniently expressed as a ratio of stream counts, in practice streams will be of various bit rates; concentration is therefore best thought of as the ratio of the bitrates. Concentration generally (at a given grade of service or blocking frequency) trends upwards with decreasing service group size.

Another useful metric of the value of BSA is yield. Yield is a function of concentration and the total number of programs included. Yield is important to consider when comparing the value of various bandwidth reclamation techniques.

As verified by actual trials conducted by the Assignee hereof, BSA provides significant concentration, which results in the ability to vacate significant portions of the previously occupied bandwidth ("free" bandwidth yield).

Also of interest is the metric of "redundant viewership". Redundant viewers are those which view otherwise unique programs. Generally speaking, the highest number of redundant viewers occurs at prime-time or just post prime time. This is also the time of greatest total viewership and the time of highest peak stream needs. In the exemplary graph of FIG. 1*d*, a design point of 70 streams would provide a non-blocking grade of service. However, significant surplus bandwidth still exists below the 70-stream level. Unfortunately, the greatest surpluses occur at times when other services (e.g., VoD) also have their lowest demands. Edge QAM resource sharing with VoD is therefore not expected to provide significant interleaving bandwidth gains. However, the BSA system can be advantageously operated to allow this surplus bandwidth to be utilized in other ways, such as for transport of data, video, voice, or even future applications which would require additional bandwidth.

Gain is a useful parameter for comparison of BSA with statistical multiplexing technology. In BSA, percent gain is defined as:

$$(\text{Concentration}-1) \times 100 \qquad \text{Eqn. (1)}$$

In this context, content that occupies the "freed up" spectrum is assumed to operate with the same level of efficiency as the content being processed (i.e. switched under the BSA architecture, or alternatively statistically multiplexed).

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bit rates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system must typically gather and keep logs or other records of programmer-specific viewership data in order to function. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VOD overflow.

In one exemplary embodiment, the network switch 194 (FIG. 1*c*) logs all channel change events and is aware of the tuning locations of all tuners, not just those that happen to be viewing BSA programs. This provides highly accurate and complete viewership data based on actual channel changes as contrasted with extrapolations or other estimation techniques.

It is an important aim of the present invention to maintain subscriber privacy, for both legal and commercial reasons. As discussed in greater detail subsequently herein, subscriber identities are protected by hashing or encryption of the tuner address prior to logging and storage. The stored address and associated events are therefore not traceable to the user account. The resulting obscured tuner address is repeatable so the necessary tuning location and user activity tracking may be performed while still maintaining complete anonymity.

In the exemplary embodiment of the present invention, the edge switch 194 (generally located in the distribution hub as shown in FIG. 1*c*) is flooded with all available programs. This improves transport efficiency, because a simple unidirectional "drop and continue" protocol is performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

Boundary Enforcement and Targeting Methods

Figure 2:
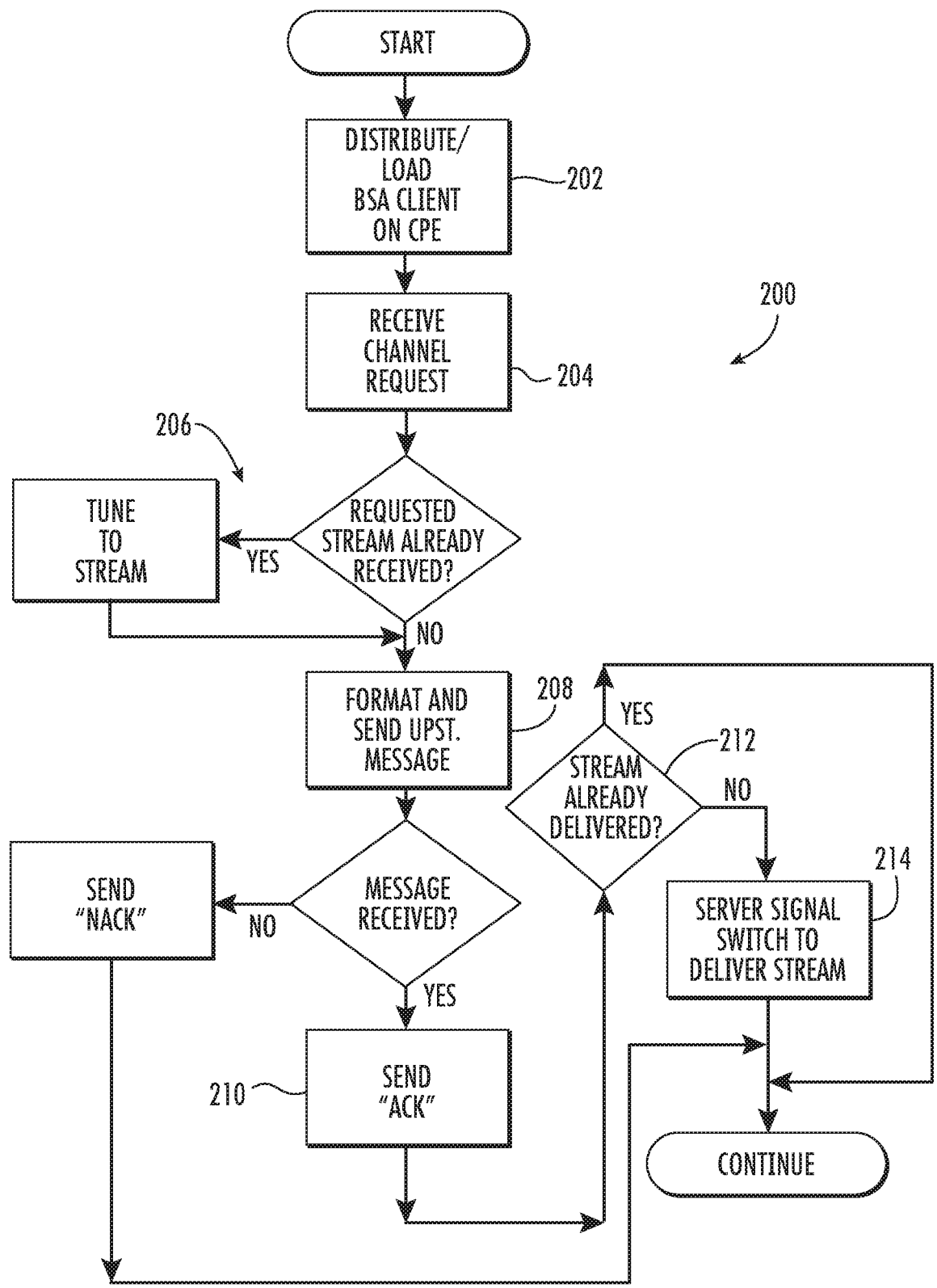
FIG. 2 is a logical flowchart illustrating a first embodiment of the boundary enforcement/targeting methodology according to the present invention, in the context of the BSA of FIG. 1c.
Figure 3:
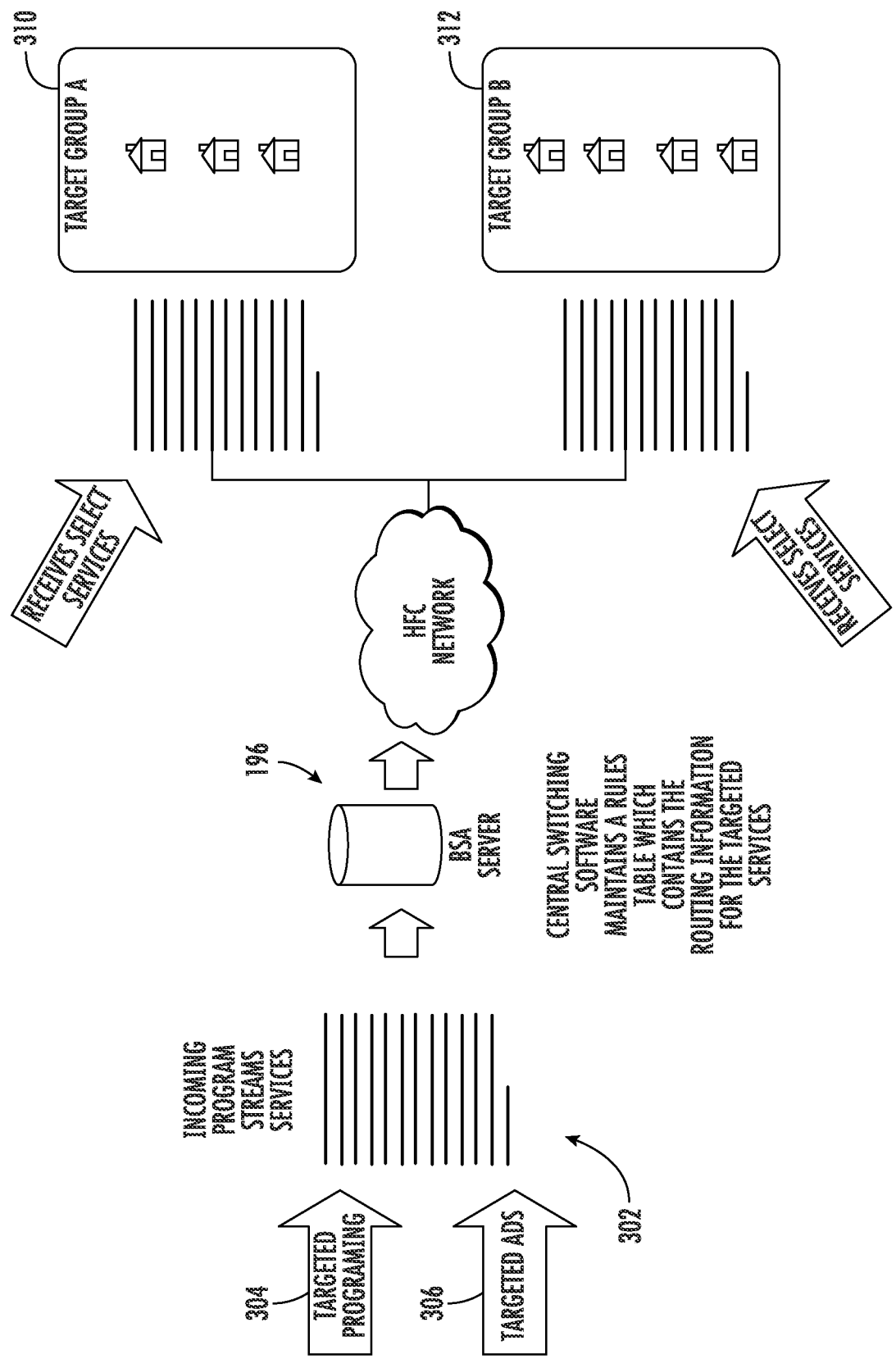
FIG. 3 is a graphical representation of the methodology of FIG. 2, showing selective enforcement of boundaries to two (2) target groups for both content-based programs and advertising.

Referring now to FIGS. 2-3, exemplary methods for enforcing one or more boundary constraints, and providing targeted delivery of content, are described in detail in the exemplary context of the BSA architecture previously described. The present invention allows for the enforcement of "boundary" constraints in a completely anonymous and transparent fashion. As previously discussed, prior art approaches to providing targeted content and imposing boundary conditions are generally predicated on having knowledge of a specific user, and/or selective insertion of the desired content into the stream(s) being delivered to that user. Furthermore, prior art approaches (such as, e.g., the "switched digital video" of Eldering described above) relate to a narrowband delivery system, in contrast to a broadcast-based system of the type utilized by the aforementioned BSA architecture.

In contrast, the parametric approach of the present invention allows for the ability to enforce one or more boundaries without having any specific identifying or personal information regarding the subscriber; rather, the exemplary embodiment of the invention only requires knowing the CPE identification (which is hashed according to a cryptographic algorithm), and a correlation to the zip code of the location of the CPE (or other descriptive information relating to the CPE or its subscriber). This maintains subscriber anonymity, and accordingly enhances security from the standpoint that personal or sensitive information associated with the subscriber's account (such as with a VOD, DVR or other similar premium service) need not be distributed or even accessed in order to provide the boundary enforcement/targeting functions. Rather, the boundary condition(s) can be enforced simply by accessing the correlation table or comparable data structure (see FIGS. 2*a*-2*d* discussed below), which correlates the identifier of a particular CPE with, inter alia, its location (zip code). This information is used to provide selective switching of content within the aforementioned switched network architecture.

All mechanisms utilized in the exemplary embodiment maintain viewer (subscriber) privacy and anonymity, since stored data would not be traceable to a specific user account. Once the server or other servicing network entity is aware of the value of a designated parameter (or of membership in a group via a server table), then decisions are made as to the response to a user program channel selection, such as for example the PEG (Public, Educational and Government) channel zoning. This approach can also be extended to dynamic membership in an advertising zone; i.e., where a given CPE's membership in the advertising zone varies as a function of time or the zone varies as a function of time.

As discussed elsewhere herein, this correlation table/mechanism may also be more than one-dimensional (e.g., where a table or other data structure of multiple boundary parameters is specified), and may be based on parameters other than geographic location. For example, demographics or even psychographics (i.e., knowledge of one or more persons attitudes, actions, behaviors, interests, etc.) may also be used as the basis of imposing logical or other boundaries and/or delivering targeted advertising.

For example, two (or more) broadcast channels that are substantially identical from a content perspective may be present at a switch. However, these channels may carry different advertising, each of which is more relevant to certain geographic, demographic or psychographic segments of the viewer base. Based on the viewership data derived, the selection between these two (or more) channels can be made, with delivery of the channel targeted to only those areas (or even individual tuners) for which it is relevant. Advantageously, each of the two channels can have different internal timing relationships if desired, since no insertions or splicing of content into the stream(s) is performed under the present invention.

As an illustration of the foregoing boundary-based functionality, consider two (2) distinct CPE, one located in a first zip code (CPE A, located in 92131), and the second in a second zip code (CPE B, located in 92127). Both of these CPE (and zip codes) are located in the same distribution hub site, but have different educational channel zones that are not allowed to overlap. One such exemplary zone is named "CPCC" (zip 92131), while the other is named "DPCC" (zip 92127). Both of these program streams would be available from the head-end or at the hub for the BEST software entity 402 (described below with respect to FIG. 4) to selectively enable/disable dependent on usage. When CPE A tunes to the educational (program) channel and the boundary is enforced, it will only be able to receive "CPCC" content. Similarly, when STB B tunes to their educational program channel with boundary enforcement, it will only be able to receive "DPCC" content. This accordingly enforces a boundary-based broadcast of the program streams.

Furthermore, the exemplary embodiment of the invention provides server autonomy as well as subscriber anonymity. Specifically, the CPE identification and targeting approach described herein has intrinsic or "autonomous" intelligence in that the server can have knowledge of group membership and other attributes without consulting any external or secondary sources such as billing or subscriber databases. This autonomous intelligence is also anonymous, from the standpoint that the server's knowledge of this group membership (and any other attributes) relies on no such external sources which specifically identify the subscriber(s), and the only information used is the aforementioned hash (and the opaque variable, described below), neither of which allow personal description of a subscriber or their premises. This is in contrast to many prior art approaches of targeting or content delivery (such as VOD), wherein the subscriber's identity and the precise premises location can in theory be accessed as well, or even must be accessed in order to properly deliver and bill the content.

Advantageously, the techniques and apparatus of the present invention can achieve a high degree of granularity. Specifically, an individual CPE 106, and even an individual tuner within a device, can be targeted based on the use of each device's unique identification (e.g., TUNER ID, TUNER USE or MAC address). As its name implies, the TUNER ID variable specifically and uniquely identifies each tuner; each CPE may have multiple tuners, and hence this variable allows identification on a per-tuner basis (versus just a per-CPE basis). TUNER USE comprises a real-time variable that is passed upstream to the server (or other network entity) every time the tuner is used. The TUNER USE variable is specific to a particular viewing event. Accordingly, the BSA server or other entity can distinguish between individual CPE or tuners (or groups thereof), and can group them based on associated attributes (e.g., or demographics, geographics, etc.), and can do so without specifically identifying any particular device of its precise location.

FIG. 2 illustrates one embodiment of the generalized methodology of boundary enforcement/targeting according to the invention. Per step 202 of the method 200, a small client program or application is first loaded onto the CPE 106. The program may be loaded as part of the bootup or initiation process, be resident as part of the navigation or other such application, or even be part of the CPE firmware. The program can be delivered to the CPE 106 via any number of different mechanisms, such as OOB in in-band channels, retrieval from a local mass storage device, retrieval via an associated IP network connection, or even via fixed or temporary media such as a CDROM, DVD, USB key, etc.

Once loaded, the client application operates according to the following protocol. When the client application receives a request for a program channel to be viewed on the CPE 106 (step 204), the client application optionally determines whether the requested channel is being delivered to the CPE 106 and if so, tunes to this channel (step 206). This determination is optional, since a "dumb" approach can be used in its place; i.e., where no determination is made, and the CPE tuner merely tunes to the requested channel knowing that delivery of the channel will occur (whether pre-existing or switched by the server, as described below).

A message is also sent from the requesting CPE 106 upstream to the switching node (e.g., BSA server 196) per step 208. This request is generated by the client application (or its designated proxy) in response to the user's program channel request entered via the user interface; the request is converted into the designated upstream messaging format (a "join" request in the exemplary embodiment). In the exemplary embodiment of the invention, the request message is utilized in all instances, such as to permit various functions such as shutting down delivery of a given content stream to certain CPE 106 (i.e., the "switched away from" channel), and/or to monitor tuner behavior and activity. However, it will also be recognized that the issuance of the upstream request can be made conditional as well, such as where the requested channel is already being delivered to that CPE, no upstream message is sent. In such case, no upstream message is required (at least for the purposes of switching content streams), and hence the message can be obviated to conserve upstream bandwidth.

The issued request is then routed to and received by the responsible network entity (e.g., hub server 196), which then issues a confirmation message confirming receipt of request per step 210.

Next, the server 196 determines per step 212 whether the requested content stream is already being delivered to the requesting CPE. As described elsewhere herein, this determination can be made using any number of mechanisms, including accessing a server-based status table of current stream delivery/switching.

Lastly, the server 196 acts upon the received request, and issued signaling to the relevant network switch 194 (step 214) to route the requested programming/content to the service group (or individual CPE) for display on the associated display device(s) if that content is not already being switched to the requesting CPE. As described in greater detail subsequently herein, the switch 194 is effectively flooded with all available broadcast streams, from which it selectively switches the appropriate stream to the designated CPE 106 (or group of CPE).

The server 196 (or CPE 106) can also retain historical/anecdotal information regarding the subscriber's viewing habits in a centralized or remote database if desired. As previously noted, this information can be stored based on a hashed index (e.g., hashed TUNER ID, TUNER USE, or MAC address), and hence individual subscriber anonymity can be preserved when the database is accessed. For example, an entity accessing the database could only tell that X number of CPE within zip code 12345 tuned to Channel A on a given date and time, without being able to reverse the hashes to determine who the precise individuals were.

In the exemplary embodiment of the invention, the BSA architecture is configured such that all switches within the network (or at least a substantial portion thereof) have all content streams available to them simultaneously. Selective switching of these streams to particular CPE (or groups of CPE) via the network switch 194 implements the boundary enforcement/targeting functionality of the invention. This approach avoids the significant disabilities associated with prior art "insertion" based systems, which attempt to precisely insert targeted content into one or more streams. In contrast, the "switched" approach of the present invention merely switches the desired content already present at the relevant switch(es) to the desired CPE or group, thereby obviating any timing analysis associated with insertion.

It will also be appreciated that two or more boundary conditions or rules can be enforced simultaneously if desired. For example, one boundary may comprise a geographic boundary such as the aforementioned zip code exemplar. Additionally, within that zip code, it may be desired to switch in content streams with a high percentage of golf advertising/promotions, since it is known that the relevant zip code has a high density of golfers/golf courses. It may also be known that golfers are typically golfing in the early portion of the day, and hence the targeted advertising will be most effective when broadcast into that zip code in the latter portions of the day (i.e., late afternoon through evening) when the golfers are ostensibly at home. Hence, the server 196 (and BEST software entity 402 described subsequently herein) can be programmed to (i) enforce the zip code boundary based on the hashed TUNER ID (and/or TUNER USE or MAC address as previously discussed) and correlation table maintained at the server by switching the targeted streams only into that zip code; and (ii) switch in the targeted streams at latter portions of each day (or even subsets of the week, such as Saturdays and Sundays only).

In the illustrated embodiment, the TUNER ID (and/or TUNER USE or MAC address, or a derivation thereof) of the CPE 106 or particular constituent tuner device, is used as the basis of the CPE identification process, although it will be appreciated that other approaches may be used. As previously described, the TUNER ID variable specifically and uniquely identifies each tuner, while TUNER USE comprises a real-time variable that is passed upstream to the server (or other network entity) every time the tuner is used. The MAC address is also an option for use with the present invention in part based on the fact under a typical cable network configuration, the MAC address is already passed upstream "in the clear" (unencrypted/unhashed) for other functions, and hence there is no compromise of security and little additional overhead in sending the address upstream for purposes of boundary enforcement/targeting under the present invention. In the exemplary embodiment, the MAC address is passed upstream via a channel select/join or other message format already existing within the system communications protocol(s) (e.g., IGMPV.3, the "Channel change protocol", DSM-CC, or specified as part of the BSA), although a custom or dedicated protocol may be used for this purpose.

When the hub server or other network entity receives the TUNER ID (or other variable) from the CPE, it generates a cryptographic "hash" of the TUNER ID. As is well known to those of ordinary skill in the cryptographic arts, a cryptographic hash comprises a mathematical function that maps values from one domain into another, and generally has the properties of being: (i) "one-way", in that it is computationally impractical or impossible to find any input which maps to any specified output; and (ii) "collision-free", in that it is computationally impractical or impossible to find any two distinct inputs which map to the same output value. In the present context, this means the hash algorithm always produces same result with the same input, yet one can't reverse the output to determine input (e.g., TUNER ID).

The present embodiment of the invention also generates a so-called "opaque" variable at the hub server 196 or other network entity. This variable comprises, in one variant, a non-specific multi-bit binary coded variable that contains intrinsic information relating to the relevant CPE/subscriber. The opaque variable can be parsed if desired, and can convey information relating to membership in one or more groups. The variable may be generated algorithmically (e.g., via a computer program running on a digital processor), or in hardware or firmware, or combinations thereof. The information reflected in the variable may be geographic in nature (e.g., relating to postal zip code, telephone area code/exchange, etc.), demographic, psychographic, or otherwise. It may also be related to BSA system on which the variable is carried (such as routing information or the like). The opaque variable is associated with the cryptographic hash previously described (derived from the TUNER ID, TUNER USE or MAC address) using any number of mechanisms, such as a table, tuple, or other data structure. In this fashion, the variable can convey multiple different types of information associated with the hash (the latter uniquely and anonymously identifying the originating CPE 106 within the network). The variable is considered opaque since it is coded (whether encrypted or not), and hence conveys no discernable information in isolation; i.e., unless correlated with information known to the coding entity (decoding alone is not sufficient). It is also not human readable.

It will also be recognized that the methodology 200 of FIG. 2 can be practiced on a network where one or more physical channels are not broadcast continuously to all CPE, but rather established as a function of other events, including e.g., a user or CPE-initiated pull or request. The basic underlying premise of such switched architectures is that the differentiated (e.g., targeted) content is not transmitted or broadcast onto the network (or to the local node or entity servicing a given CPE) until there is a valid request to view the content. Such request may comprise, for example, a given user's CPE tuning to the UI (program) channel carrying the targeted content, or another signal from the CPE to the head-end or other servicing network entity. In this fashion, the bandwidth of the network is conserved, since programming broadcasts or transmissions that no one is watching are obviated.

It will further be appreciated that one or more indirect sources may be used to provide the aforementioned upstream channel request information (or alternatively downstream channel information for delivery to the CPE 106), whether through interfacing directly with the CPE, or indirectly through another network agent. For example, a proxy network entity (e.g., remote server) can be used as an intermediary to provide this information via an IP connection (over the cable network or otherwise) to the CPE 106 or BSA server 196. Alternatively, a wireless interface to the CPE (such as via an 802.11 WLAN, 802.16 WiMax, 802.15 PAN, or satellite interface) can be used to deliver or send the information.

Furthermore, "pre-positioned" information may be used, such as where one or more predetermined TUNER ID, TUNER USE, or MAC address and/or viewership data (or other information) are stored within the CPE 106 or a connected device, such as an IEEE-1394 appliance, and utilized at CPE initialization.

It will also be appreciated that the present invention may utilize metadata as part of its upstream (or downstream) communication protocols. Generally speaking, "metadata" comprises extra data not typically found in (or at least not visible to the users of) the network. This metadata may be validated against relevant specifications if desired, such as those provided by CableLabs. The metadata might specify the date, GMT or other start time reference, CPE profile data, maintenance and error-related data, viewership data, service level (e.g., SD or HD) capabilities, PID/TSID/QAM channel(s), etc., and can be rendered in human-readable form if desired. It will be recognized that additional and/or different metadata content may be used consistent with the invention. The metadata information can be packaged in a prescribed format such as a markup language (e.g., XML). The metadata (files) may also be encrypted; encryption algorithm information of the type well known in the art may also be included.

The present invention may also be utilized consistent with the bandwidth conservation and channel mapping techniques and apparatus disclosed in co-pending and co-owned U.S. patent application Ser. No. 11/048,348 entitled "METHOD AND APPARATUS FOR NETWORK BANDWIDTH CONSERVATION" filed Feb. 1, 2005 and incorporated herein by reference in its entirety. For example, the aforementioned application discloses improved apparatus and methods for reducing channel bandwidth requirements in, inter alia, a switched broadcast (e.g., BSA) environment.

The switched network approach is further leveraged through the use of a distributed network architecture; i.e., the use of a plurality of local nodes or servicing entities such as that shown in FIG. 1b. Consider the hypothetical case of where no local nodes are used, and hence all CPE are functionally coupled to a single node (e.g., the head-end). Under the aforementioned switched digital approach, the first viewer desiring to view the targeted content would cause a broadcast session to be initiated, with the content being broadcast to the entire network. This is inefficient from a bandwidth conservation standpoint, since a significant amount of the bandwidth of the entire network is used to service as little as one viewer.

Conversely, in the limiting case where each separate premises had its own dedicated local servicing node (and QAMs), each of these nodes could switch the targeted broadcast on/off locally, thereby not affecting the operation of the rest of the network. Additional bandwidth for the selected channel would only be required within the distribution path from the head-end to that particular servicing node.

As can be appreciated, most practical implementations of the broadcast switched concept will reside somewhere between these two extremes; i.e., with the network having a plurality of local nodes, each node servicing a plurality of CPE/premises as shown in FIGS. 1b and 1c. It will also be appreciated that the term "local" as used herein need not refer exclusively to a geographic or spatial frame of reference, but may also comprise partitioning in a logical sense, such as where one node services a group of customers who are logically proximate (e.g., based on service plan, demographics, viewing habits, consumption patterns, etc.).

FIGS. 2a-2d illustrate exemplary embodiments of the aforementioned correlation "table" data structures useful with the invention for enforcing boundaries and providing targeted (anonymous) content delivery. FIGS. 2a and 2b represent exemplary source tables; i.e., Tuner Usage Information (FIG. 2a) and Target ID Information (FIG. 2b). FIGS. 2c and 2d represent exemplary cross-reference tables; i.e., Unique ID Target Data (FIG. 2c) and Conditional Target Criteria (FIG. 2d). These tables (or other data structures) can be either created manually, such as by manual data entry or creation in an authoring environment, or populated and accessed automatically. The exemplary switching software employed within the network utilizes these source and cross-reference tables to enable or disable a service stream to that particular CPE 106 and others within or outside of the designated geographic or logical "boundary".

FIG. 3 graphically illustrates the methodology of FIG. 2 in the context of the exemplary HFC cable network with BSA capability. As shown in FIG. 3, the incoming program streams and services 302 include targeted programming 304 and advertising 306. The BSA server 196 (FIG. 1c), receives the targeted content 304, 306, and selectively enforces the boundary and targeting rules (routing) such that only selected CPE within the network (i.e., those in Target Group A 310 and Target Group B 312) receive the content that they should. As will be described in greater detail below with respect to FIG. 4, the exemplary embodiment of the invention comprises a BEST entity (software) 402 which runs on the BSA server 196 and provides the enforcement/targeting functionality.

It is also noted that while FIG. 3 shows a single BSA server 196, the aforementioned BEST entity 402 may also (i) comprise a plurality of individual or substantially "stand-alone" processes which enforce the rules for a given sub-portion of the network (e.g., a single hub), or (ii) be distributed across multiple platforms as a distributed application or process (including communication capabilities between the constituent components thereof).

As a simple example of stand-alone processes (item (i)), consider the case wherein a server is disposed at each hub site (see FIG. 1c), with a simple boundary/targeting engine that enforces zip code-based location boundaries (i.e., by correlating the ID of each CPE with a zip code, and then targeting content based thereon).

As an example of the distributed process approach (item (ii)), consider the "stand-alone" case described above, except wherein the individual engines (processes) on each hub are in logical communication with one another. Coordination between two or more hubs can then occur, such as where the subscribers having a given zip code are distributed across two or more hubs, and it is desired to simultaneously enforce or target all such users within the same zip code with a certain service or content. Similarly, such "higher level" coordination (i.e., between two or more nodes or hubs) can be readily accomplished using the centralized BSA server architecture of FIG. 3. The present invention further allows hybridization of these architectures (e.g., mixtures of the distributed, stand-alone and centralized approaches across various portions of the network), thereby adding greater operational flexibility.

The boundary enforcement/targeting mechanisms described herein may also be used with bandwidth allocation and optimization mechanisms, whether in the switched broadcast (BSA) environment or otherwise. For example, the methods and apparatus described in co-owned and co-pending U.S. patent application Ser. No. 10/881,979 filed Jun. 29, 2004 and entitled "METHOD AND APPARATUS FOR NETWORK BANDWIDTH ALLOCATION", incorporated herein by reference in its entirety, may be used to provide enhanced allocation of bandwidth between SD and HD sessions across multiple physical channels (QAMs) or even logical channels within the network. This allocation can be made effectively transparent to the switching processes described herein; i.e., the content delivered to the switches, irrespective of HD/SD allocation, is merely treated as "content" for purposes of boundary enforcement and targeting.

Also, the physical channels provided by the bearer network can be comprised of a plurality of constituent channels, as is described in co-owned and co-pending U.S. patent application Ser. No. 11/013,671 filed Dec. 15, 2004 and entitled "Method And Apparatus For Wideband Distribution Of Content", incorporated herein by reference in its entirety. For example, the content of a given transport stream can be multiplexed across a plurality of physical carriers using a wideband approach. The multiplexed signal is reassembled at the CPE 106 using a wideband tuner (or a plurality of related tuners) and information from the head-end as to the multiplexing scheme and channels used. Hence, for the purposes of the present invention, the aggregation of multiplexed channels acts like a single QAM.

It will also be recognized that the present invention can be configured to use the VC1 (Microsoft Windows Media 9 Series) coder-decoder, and in fact still other codecs. Furthermore, the invention can utilize the well known Internet protocol (IP) as a transport variable if desired. Other such substitutions will be recognized by those of ordinary skill provided the present disclosure.

It is further noted that two methods can be used by the network operator, if desired, to obtain CPE-specific identification information, such as to aid in law enforcement or other efforts which require identification of a specific CPE or tuner.

First, as previously noted, anonymity is provided by the present invention on a stored, retrievable basis only. Specifically, during the actual time of transmission of data from the CPE 106 to the hub server (or head-end), the source of such transmissions can be determined using e.g., network analysis equipment of the type well known in the cable network arts. Somewhat akin to tracing a telephone call on a PSTN while the caller is still on the line, a cable subscriber's CPE can be traced while actively operating and communicating with upstream entities.

Second, a subscriber's CPE 106 can be physically confiscated (such as by law enforcement) and the various identifying information such as TUNER ID, TUNER USE, and MAC address "read back". Once in possession of this information, it can also be run through the hashing algorithm(s) to verify that the hashed information produced thereby corresponds to the hashed information identified in the server table/database.

Software Architecture and Business "Rules Engine"

Figure 4:
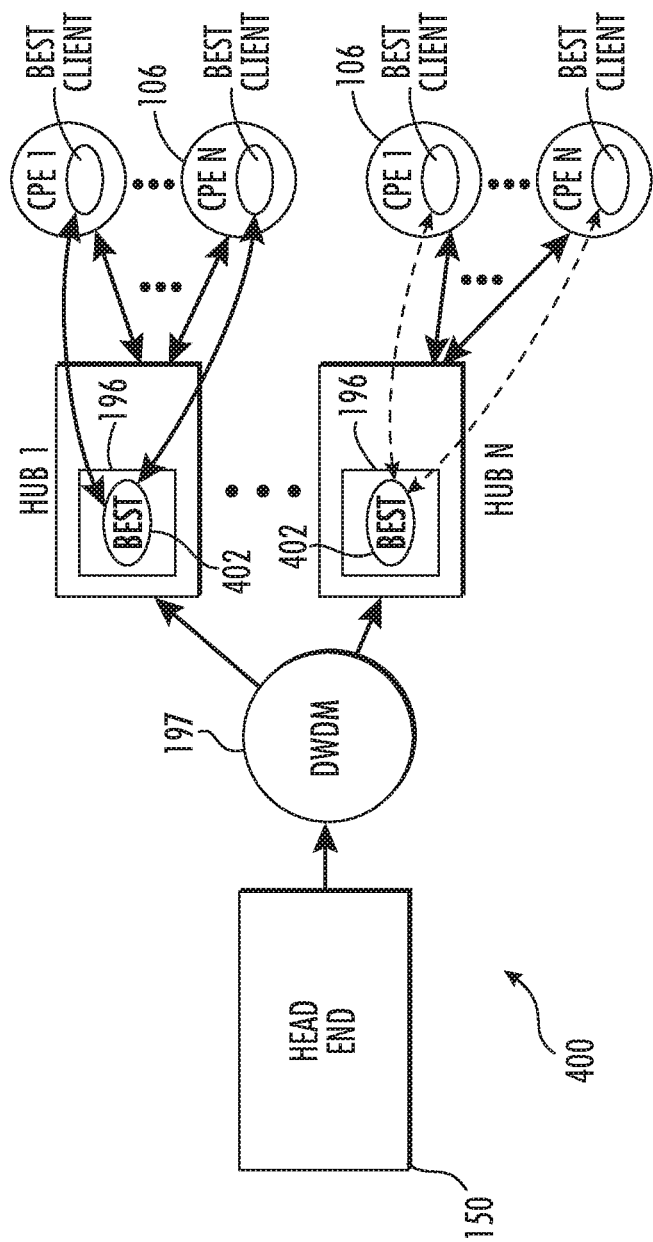
FIG. 4 is a functional block representation of an exemplary software architecture including a Boundary Enforcement Switching and Targeting (BEST) software entity, according to the present invention.

Referring now to FIG. 4, one exemplary embodiment of the software architecture of the present invention is described. While the following discussion is cast in terms of one or more Boundary Enforcement, Switching and Targeting (BEST) entities resident at the hub site and/or distributed over the various components of the network, it will be appreciated that other architectures may be used.

As shown in FIG. 4, the basic BEST architecture 400 of the invention comprises a BEST software entity 402 running on the servicing node 404 (e.g., the BSA server of FIG. 3), or alternatively the head end 150) which is in process communication with the exemplary client applications running on the CPE 106. The BEST entity 402 operates to, inter alia, (i) receive channel requests associated with user or program channels from the CPE 106; (ii) determine whether that same user channel is being already delivered to the CPE 106 (iii) verify that the requested broadcast channel is in fact available for switched broadcast; and (iv) transmit the requisite switching information to the relevant switch to cause delivery of the broadcast channel requested to that CPE (or a group of CPE). As previously noted, the BSA paradigm functions by providing effectively all broadcast channels to each switch; hence the BEST entity 402 need merely tell the relevant switch to route that channel for delivery to the designated CPE tuner(s) via the tuner or CPE identifier (e.g., TUNER ID, TUNER USE or MAC address) associated therewith.

Channel requests are received by the BEST 402 from the CPE via upstream OOB channels (reverse data channels) or other pathways, and processed within the BEST to, inter alia, extract the required information contained therein including, e.g., the TUNER ID, TUNER USE or MAC address. Other information may also be included within the request and extracted at the BEST 402, such as a transmission or local timestamp, coding, CRC or encryption data, routing information, etc. Any number of different protocols can be used for this purpose, such as for example those specified in Part 6 of "MPEG-2: Digital Storage Media-Command And Control" (referred to as DSM-CC) defined under the ISO/IEC 13818-6 International Standard, IGMPv.3, a Trivial File Transfer Protocol (TFTP), Real Time Protocol (RTP/RTCP), TCP/UDP, or Session initiation Protocol (SIP). A confirmation message (e.g., DSM-CC) is also optionally issued in response to the client request message, thereby acknowledging the CPE request.

In one exemplary embodiment, the mini-carousel protocol (MCP) is used to provide a real-time list of available program streams. Only when a desired or requested stream is not present does the BEST entity become involved in obtaining this stream for delivery to the requesting CPE. The BEST entity knows which streams are being delivered (e.g., via a table or similar mechanism typically maintained in the network).

Hence, the determination of which channels or streams are currently being delivered to the CPE can be made at the server, at the CPE, or at both locations if desired.

In the exemplary embodiment, the BEST 402 performs cryptographic hashing of the TUNER ID, TUNER USE or MAC address to form a hashed address according to any one of a number of well known algorithms (so long as the previously described "durability and repeatability" are provided). The request/switching process is completely autonomous (self-contained) from the standpoint that the cryptographic hash (and optionally any associated information passed up from the CPE) and stored data structure(s) such as tables maintained at the server 196 can be used as the sole basis for determining switching behavior if desired. The exemplary embodiment of the BEST 402 uses routing information that is maintained in a reference table that is composed of a list of (hashed) set-top box identifiers, a location designator (such as zip, school area, etc), target parameter and group criteria (i.e., service group, package type, etc), although other formats and data structures may be used.

Consider, for example, the simple case of where the CPE 106 passes up its TUNER ID, USE or MAC address in the clear, as well as appended zip code information relating to the location of the tuner. The BEST entity 402 hashes this value, and associates the hashed value with the zip code. This information is stored within a table or other data structure for subsequent use. Accordingly, when the MSO wishes to target CPE within a certain zip code, it simply accesses the aforementioned table or data structure (e.g., on a query identifying all record or entries having the desired zip code), and returns all of the hashed identifier for tuners within that zip code. The BEST entity 402 can then simply instruct the relevant switch to deliver the target content to those tuners.

In another variant, the BEST 402 is given additional "intelligence" to specifically identify the requesting CPE 106 when so instructed, such as when conducting maintenance or troubleshooting of specific CPE. The TUNER ID, TUNER USE, or MAC address, which may also be stored for PPV and other functions, can also be used for this purpose. This functionality can be accomplished by the BEST 402 by extracting the CPE identifier (e.g., TUNER ID, etc.) information from the request message as previously described, and storing this in a secondary data structure in a non-hashed form. Obviously, this secondary data structure should be protected from surreptitious access or use, since it directly correlates specific ID/USE/Address values with specific subscribers, locations, and feasibly viewership data.

As noted above, the BEST entity 402 may also optionally determine whether the requested broadcast content is in fact available for distribution via a given switch. This can be accomplished by, e.g., signaling another process within the head-end 150 or hub site, or alternatively periodically evaluating service or status messages issued by a content source entity within the head-end. The former approach advantageously reduces network overhead, since status messages/signals are only issued when required, as opposed to periodically (whether they are needed or not). A local table can also be maintained at the server as previously described.

It will be recognized that depending on the specific network configuration utilized, individual broadcast programs may or may not be continuously carried on the same frequency or QAM(s). In the latter case, the program will change locations with respect to the tuner, and hence mapping must be employed to map the same program channel to the appropriate QAM at that point in time. In the exemplary embodiment, the aforementioned carousel protocol (e.g., "Mini Carousel Protocol" or MCP) is used to interface between the Broadcast Services Architecture (BSA) Server 196 and the client program running on the CPE 106. This interface provides a method of distribution of tuning information from the BSA server to the CPE 106 to enhance channel change operation in the BSA. For example, each MCP message begins with a 8-byte MCP message header formatted as follows: (i) Bytes 0-3: Service Group ID; and (ii) Bytes 4-7: IP Address of Active BSA Server. Each active service available to the client by tuning (i.e. is in a carrier available to the client) is indicated by an entry in the BSA MCP message. A 10-byte entry is present in the message for each active service. The exemplary format of the entry is as follows: (i) Bytes 0-3: Broadcast Program ID; (ii) Byte 4: Modulation Index (6=QAM-16, 7=QAM-32, 8=QAM-64, 12=QAM-128, 16=QAM-256); (iii) Bytes 5-7: Carrier Center Frequency/100; (iv) Bytes 8-9: MPEG Program Number.

It will be appreciated, however, that other protocols may be used in place of the MCP described above.

As will be appreciated by those of ordinary skill in the software arts, the BEST 402 may comprise a distributed application (DA). The server portion of the BEST 402 at the servicing node (server 196 at the hub site) communicates with the client portion(s) at each CPE 106 via in-band or OOB physical channels, thereby forming logical channels between the servicing node process and the CPE portion. The client portion may also communicate with the Watch TV, EPG, or other application within the CPE 106 as required.

Furthermore, the aforementioned BEST entity may be implemented in a local or global (i.e., network-wide) fashion. For example, in one variant, the BEST and associated rules engine operate at the local service node level, in effect treating the local node (hub site) as an entire network for purposes of targeting and boundary enforcement. In another variant, the BEST engine is applied across multiple local service nodes, in communication with one another. In yet another variant, the BEST engine is applied globally across the entire network (including, e.g., across multiple geographic areas and time zones).

Server Device

Figure 5:
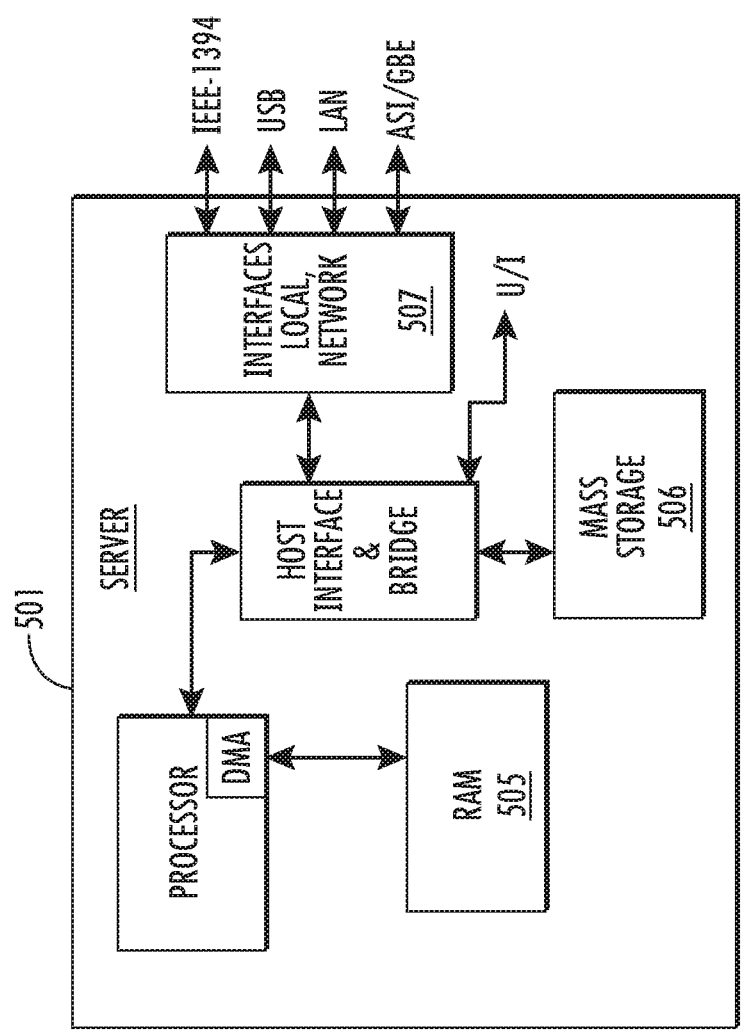
FIG. 5 is a functional block diagram illustrating an exemplary network server device (including BEST entity) according to the invention.

Referring now to FIG. 5, a first embodiment of the improved network server device with BEST capability according to the present invention is, described. It will be appreciated that while described in the context of a centralized switching (e.g., BSA) server 196 as shown in FIG. 1c, the device may be adapted for use at other locations within the network. Furthermore, as previously noted, the server BEST entity 402 may comprise a distributed functionality, wherein two or more portions of a distributed application (DA) in communication with one another are utilized.

As shown in FIG. 5, the exemplary server device 501 generally comprises an OpenCable-compliant network server module including a digital processor(s) 504, RAM 505, mass storage device 506, and a plurality of interfaces 507 for connection with other network apparatus such as LANs, the local service node hardware, IP routers and other packet network devices, network management and provisioning systems, local PCs, etc. Other components which may be utilized within the server device 501 (depending on where it is employed and how it is physically implemented) include RF tuner stages, modulators/demodulators, encryption/decryption, amplifiers, board level electronic components, as well as media processors and other specialized SoC or ASIC devices. Support for various processing layers and protocols (e.g., 802.3, DOCSIS MAC, OOB channels, DHCP, SNMP, UDP, SNMP, H.323/RTP/RTCP, VoIP, SIP, etc.) may also be provided as required.

The server device 501 of FIG. 5 may take any number of physical forms, comprising for example one of a plurality of discrete modules or cards within a hub or head-end component of the type well known in the art. The server may also comprise firmware, either alone or in combination with other hardware/software components such as those previously described. Alternatively, the server module 501 may be a stand-alone device disposed at the hub, head-end, or other location. Numerous other configurations may be used. The server device 501 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the BEST functionality described above may take the form of one or more computer programs running on a single device disposed within the network (such as the server module 501). As yet another example, portions of the functionality may be rendered as a dedicated or application specific IC (ASIC) having code running thereon. Myriad different configurations for practicing the server device of the invention will be recognized by those of ordinary skill in the network arts provided the present disclosure.

Exemplary CPE

Figure 6:
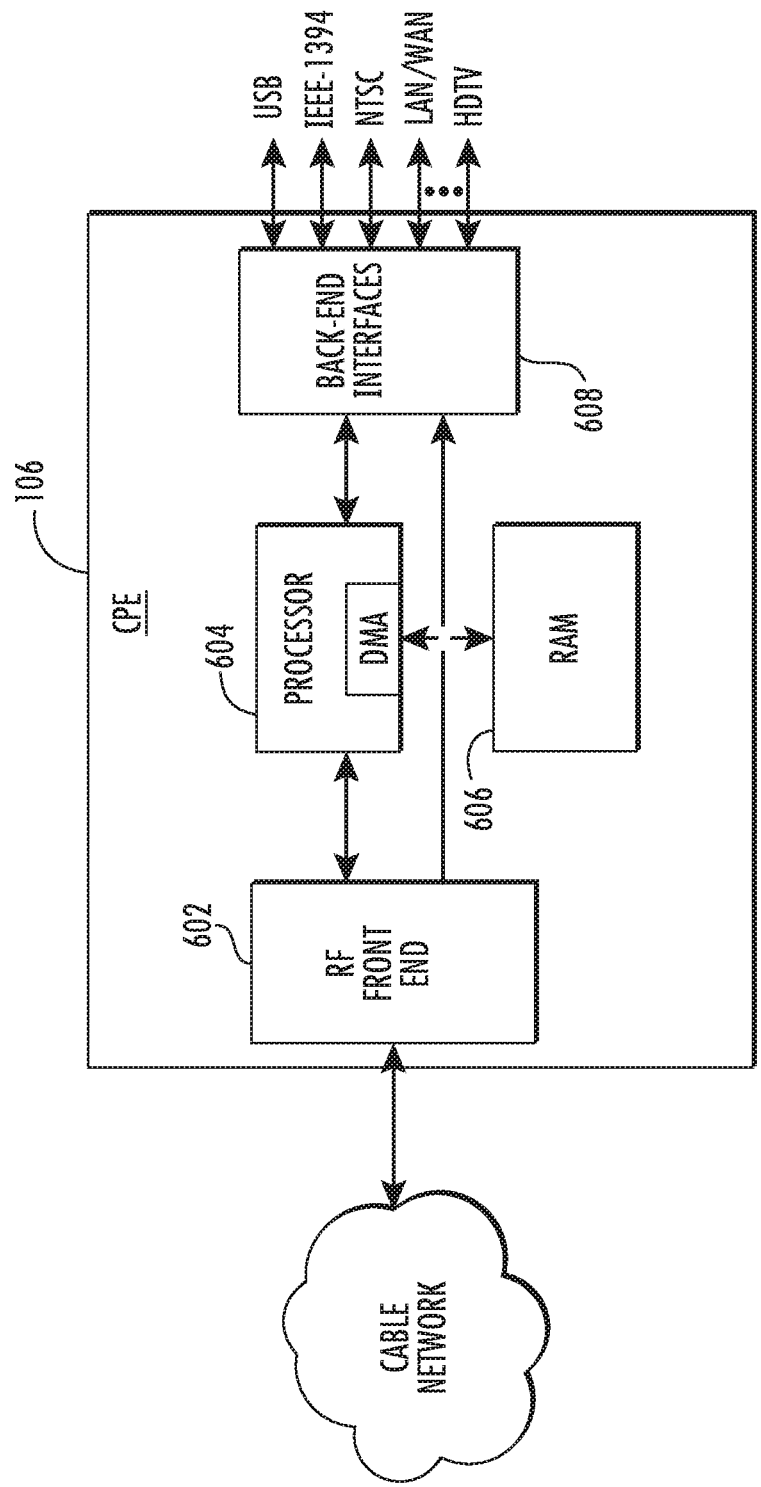
FIG. 6 is a functional block diagram illustrating an exemplary CPE device according to the invention.

FIG. 6 illustrates a first embodiment of the improved CPE 106 according to the present invention. As shown in the simplified diagram of FIG. 6, the device 106 generally comprises and OpenCable-compliant embedded system (e.g., DSTB) having an RF front end 602 (including tuner and demodulator/decryptors) for interface with the HFC network 101 of FIGS. 1-1b, digital processor(s) 604, storage device 606, and a plurality of interfaces 608 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 6 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 6 is also provided with an OCAP 1.0-compliant application and Java-based middleware which, inter alia, manages the operation of the device and applications running thereon. It will be recognized by those of ordinary skill that myriad different device and software architectures may be used consistent with the tuning and channel request functions of the present invention, the device of FIG. 6 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application 406 or the like, which services those program or user channels available over the network. The Watch TV application, residing in memory, provides such functions as channel navigation control, channel selection in response to a channel change event, etc. In another embodiment, the Watch TV, application further comprises all necessary functionality need to support both the channel request and subscriber activity profiling features previously described herein (i.e., comprises the client application previously described).

Specifically, regarding channel selection, the application is configured to (i) determine if a given requested program channel is already being delivered to the CPE tuner; and (ii) if not, format and transmit an upstream request (e.g., request/join message) which alerts the server entity 402 that the program channel has been requested.

As previously described, the determination of whether a given program channel is being delivered to the tuner can performed by either the server (BEST), the CPE 106, or both through, inter alia, access to tables maintained locally at the server, and communication of such information between the CPE and server using the MCP.

In the exemplary embodiment of the invention, the request message is utilized in all instances, such as to shut down delivery of a given content stream to certain CPE 106, and/or to monitor tuner behavior and activity. For example, where a request message is issued by a given CPE< the receiving entity (e.g., hub server) can know that that tuner will not be utilizing the channel from which it is being tuned. Also, these request messages can be aggregated over time (based on TUNER ID, etc.) to form a historical or anecdotal database for viewing habits of that tuner (or CPE). This information can be utilized for, inter alia, "shaping" of the content subsequently delivered to that tuner/CPE.

In the illustrated embodiment, the client program resident on the CPE 106 tracks and reports user activity to the relevant server(s) for each CPE. This activity tracking is optionally provided with a low latency, since the server manages bandwidth consumption (via an algorithm or other logical process resident at the server) by removing streams that are not being viewed based on user activity data received from the various CPE. Hence, timely receipt and analysis if the CPE activity data allows for rapid adjustments by the bandwidth management algorithm, thereby increasing network bandwidth efficiency.

It is also noted that upstream bandwidth consumption by the aforementioned protocol is not significant; the size and frequency of messaging by the CPE (even when considered in the aggregate) is effectively inconsequential, thereby making the processes of the present invention substantially transparent in terms of bandwidth consumption. It is also noted that in the illustrated embodiment, upstream communication is required for viewers to initiate new programs. However, if a program is already active, the upstream is not needed, so not all functionality is lost in the event of a loss of upstream communication capability.

It will also be recognized that while the foregoing methodology and apparatus is described in the context of a server-centric targeting and enforcement/targeting paradigm (i.e., where a processing entity associated with the hub server or other network server performs the CPE identifier hash and opaque variable generation), a more CPE-centric approach can be utilized, such as where the CPE generates its own identifier hash before transmission upstream using a local resident hash algorithm. Similarly, generation of the opaque variable, and even generation of data structures associating the hashed address and the opaque variable(s), can be performed at the CPE 106 when properly configured. Such an approach effectively distributes much of the processing to the individual CPE, which may be desirable under certain circumstances such as during maintenance or outage conditions, or unusually heavy loading of server assets.

Furthermore, the CPE 106 can track, via the client software running thereon, the user's viewing habits over time and store this information for (i) transmission upstream, or (ii) indigenous analysis. It can also be configured to determine which channels it should receive based on this analysis (as well as optionally other data provided from the server or head-end). Furthermore, the exemplary CPE 106 can generate a variable (e.g., a content "shaping" variable) to send upstream for this purpose, or alternatively select from a predetermined list of variables. Myriad different configurations consistent with the invention will be recognized by those of ordinary skill provided the present disclosure.

Operations/Business Rules Engine

In another aspect of the invention, the aforementioned BEST entity 402 (e.g., rendered as one or more computer programs) includes a so-called "rules" engine. This engine comprises, in an exemplary embodiment, a series of software routines running on the server device 501 or other associated hardware/firmware environment adapted to control the operation of the BEST algorithms previously described. These rules may also be fully integrated within the BEST entity 402 itself, and controlled via e.g., a GUI on a PC connected to the server 501. In effect, the rules engine comprises a supervisory entity which monitors and selectively controls, via the BEST entity 402, the enforcement and targeting functions at a higher level, so as to implement desired operational or business rules. The rules engine can be considered an overlay of sorts to the BEST entity algorithms. For example, the BEST entity 402 may invoke certain operational protocols or decision processes based on requests received from the CPE, demographic data, geographic data, etc. However, these processes may not always be compatible with higher level business or operational goals, such as maximizing profit or system reliability. Hence, when imposed, the business/operational rules can be used to dynamically (or manually) control the operation of the BEST 402. The rules may be, e.g., operational or business-oriented in nature, and may also be applied selectively in terms of time of day, duration, specific local areas, or even at the individual user level.

For example, one rule implemented by the rules engine may comprise only providing targeted advertising to certain classes of subscribers (e.g., those at a premium level of service, since these subscribers may be considered to have the highest revenue potential or likelihood of responding to the targeted advertisement).

Another rule might impose a moratorium on establishing or allocating new physical channels/QAMs to the channel requests until a certain minimum threshold of available bandwidth is present, thereby avoiding contention for bandwidth resources with "premium" services such as VOD or the like.

It will also be appreciated that certain broadcast channels (e.g., those more heavily promoting "TV-commerce" or the like) can be considered a basis for channel switching or targeting decisions. Specifically, channels can be allocated to those users which, e.g., based on demographics, historical patterns, geographic area, etc. will make best use of the bandwidth in terms of monetary return, profit, or some other business performance metric. For example, it may be know through historical usage or purchase data that certain zip codes will tend to respond better to increased targeted advertising than other zip codes (say, due to the increased disposable income of residents in that zip code). Hence, an advertiser's budget is most effectively used when their advertisements are included in streams which are switched into such zip codes. An MSO might also be able to charge a premium rate for advertising for such channels, since the advertiser's expected yield is typically higher than for channels switched into other zip codes. Accordingly, the MSO might invoke a business rule that selectively switches channels carrying only "premium" advertisements into the best zip codes (or demographic slices), while switching channels with second-tier advertisements into other zip codes or demographic slices.

As an exemplary advertising-related use of the targeted advertising functionality of the invention, consider the case where a first CPE (CPE A) is a frequent (heavy) tennis or golf channel viewer, and a light video game channel viewer. Conversely, a second CPE (CPE B) is a infrequent tennis/ golf channel viewer and a frequent video game channel viewer. Under the present invention, a stream containing target "tennis" or "golf" enthusiast advertisement or infomercial could be switched to the tennis or golf channel, respectively, that is ultimately received by CPE A, but not by CPE B. Similarly, and a channel with a target "video-game" enthusiast advertisement could be switched to CPE B, but not by CPE A.

It will be appreciated that less "binary" approaches than that described above can be utilized consistent with the invention, whether in the context of enforcing geographic boundaries, targeted advertising, or otherwise. Specifically, the foregoing approach to targeted advertising effectively provides one of two states for the stream containing the targeted advertisement; i.e., delivered or not delivered. This approach has the advantage of simplicity, in that little real intelligence is required for implementation. For example, a supervisory process (e.g., algorithm) may comprise a fuzzy logic, Bayesian, or similar approach to classify individual CPE into one of two categories in terms of a particular advertisement context (e.g., "enthusiast" or "non-enthusiast"), which can then be used as the sole (or at least partial) basis for delivering or disabling the channel containing the advertisement, respectively, for the designated CPE. The categorization may be based, for example, on aggregated historic (anecdotal) data for that subscriber which is pooled irrespective of other considerations (such as, e.g., the day of the week, the particular family member viewing, and/or the time of day).

However, this aggregated logic is less optimal where the categorization of a given CPE (and hence its viewing subscribers) is less clear-cut. Consider, for example, the case where a given CPE/subscriber is an avid tennis or golf channel watcher (aka "enthusiast") on weekends, yet during the week (i.e., Monday through Friday) they are not, the latter skewing the statistics for that premises/CPE toward the "non-enthusiast" categorization. Similarly, one family member of a given premises may be a golf or tennis enthusiast, while others are not, the latter again skewing the statistics. Accordingly, alternative embodiments of the BEST/rules software of the invention include algorithms comprising additional "intelligence" useful in making more precise determinations (and categorizations) of a given CPE 106 at a given point in time. For example, one such algorithm determines the current date and time (such as from any readily available source such as an SI reference), and utilizes this information to access the aforementioned tabular data (or other data structure) for that CPE in order to enforce the proper boundary condition(s) or targeting for that point in time. Such proper enforcement/targeting may comprise, e.g., switching of channels containing more or less golf- or tennis-related advertising, the availability (or lack of availability) of a certain location-specific program, etc. This enforcement/targeting may be discrete in nature (e.g., where the algorithm switches between alternative enforcement/ targeting profiles at a discrete point in time), or alternatively more continuous (e.g., where the algorithm progressively increases or decreases the percentage of a certain type of content/advertising as a function of time).

Many other approaches and combinations are envisaged consistent with the invention, as will be recognized by those of ordinary skill when provided this disclosure.

In another aspect, the present invention can advantageously be utilized to perform "backhauls" to the local hub or other network node. For example, a business-class circuit backhaul to the local hub is envisioned, such as for "neighborhood camera" applications. In one exemplary embodiment, separate video feeds, which may be analog or digital, from one or more cameras (or other sensors) are generated and backhauled using the local content-based network distribution system. These cameras or sensors may be disposed in and utilized for any number of different functions, such as in a high-rise to monitor various areas for security, at the gates of a gated community, in an enterprise or business facility, such as to monitor various inventory storage locations or portions of the manufacturing line, by at government laboratories or military installations, etc. Specifically, this backhaul" approach of the present invention removes the downstream bandwidth limitations under prior art approaches; rather, the only effective limitations are in the upstream direction (since the video or other signals from the cameras/sensors are being backhauled to the local hub in the upstream direction). Signal replication of the type well known in the networking arts is used to efficiently make the backhauled content available immediately for transmission in the downstream direction. The upstream signals may be replicated on a node-by-node basis, and every node can have its own cameras/sensors if desired.

Furthermore, there is advantageously no requirement that the cameras or sensors be disposed on same physical topology. Specifically, the backhaul of the present invention may be wireless, coax, fiber, DDAS (development dedicated access services), etc., or any mix thereof.

Hence, under one exemplary scenario, the backhauled signals are delivered to the hub and replicated, and then delivered (in the forward or downstream direction) to selective subscribers delivered to subscribers in a housing complex, etc., such as to be able to view the garage of the complex and monitor for theft.

The signal can also be backhauled further inward toward the core, repeated (replicated), and then made available to multiple different hub servers, the latter being disposed closer to the edge of the network. Ideally, the length of the backhaul is kept to the minimum, so as to reduce the need to deploy additional transport capacity (and bandwidth), as well as to reduce latency of the system, and increase reliability.

Furthermore, "neighborhoods" or other geographic/demographic/psychographic groupings to be monitored (or to which the replicated feeds are delivered) can be defined on-the-fly using the approach of present invention, all while maintaining the aforementioned attributes of source anonymity and autonomy.

These services can form the basis of a business model within the aforementioned cable system, thereby providing an additional revenue stream obtained largely from underutilized bandwidth already existing within the system by virtue of the broadcast switched architecture (BSA). This adds great flexibility to the network operator, and allows for generation of revenue from otherwise unutilized "upstream" bandwidth" that is already available in the extant network infrastructure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized method of operating a content delivery network having a switched broadcast architecture, the content delivery network comprising at least one switching node and a plurality of computerized client devices, the computerized method comprising:
   providing a first identifying value associated with a computerized client device;
   converting the first identifying value to a second identifying value, the second identifying value preventing determination of the first identifying value therefrom;
   accessing a correlation between the second identifying value and at least one data element, the at least one data element being selected from at least one of: (i) demographic data; (ii) geographic data; or (iii) psychographic data; and
   based at least in part on the accessing, switching at least one broadcast content option to the computerized client device using the at least one switching node;
   wherein the switching of the at least one broadcast content option comprises:
      identifying at least one of a plurality of digitally rendered content being then-currently broadcast in a digital content stream to at least the computerized client device as a candidate for removal from the digital content stream, the identifying based at least in part on a prescribed threshold related to viewing activity associated with the at least one of the plurality of digitally rendered content;
      based at least on a network resource availability associated with the computerized client device, determining that the removal is appropriate; and
      based at least on the identifying and the determining, replacing the at least one of the plurality of digitally rendered content identified for the removal with the at least one broadcast content option for delivery in the digital content stream broadcast to at least the computerized client device.

2. The computerized method of claim 1, wherein:
the providing the first identifying value comprises providing a TUNER identifier (ID); and
the converting comprises generating a cryptographic hash value based at least in part on the TUNER ID.

3. The computerized method of claim 1, wherein:
the providing the first identifying value comprises providing a TUNER USE; and
the converting comprises generating a cryptographic hash value based at least in part on the TUNER USE.

4. The computerized method of claim 1, wherein:
the providing the first identifying value comprises providing a media access control (MAC) address; and
the converting comprises generating a cryptographic hash value based at least in part on the MAC address.

5. Computerized network apparatus configured for delivering digitally rendered content to individual ones of a plurality of computerized client devices, the computerized network apparatus comprising:
   server apparatus disposed at a hub of a switched content delivery broadcast network, the server apparatus comprising:
   processor apparatus;
   network interface apparatus in data communication with the processor apparatus; and
   storage apparatus in data communication with the processor apparatus, the storage apparatus comprising at least one computer program configured to, when executed on the processor apparatus:
      determine a plurality of media access control (MAC) addresses, each one of the plurality of MAC addresses being associated with a respective one of at least a portion of the plurality of computerized client devices;
      secure the each one of the plurality of MAC addresses using a one-way cryptographic hash;
      determine a geographic or network topological commonality shared among individual ones of at least the portion of the plurality of computerized client devices;
      assign a coded variable to represent the geographic or network topological commonality;
      generate at least one data structure, the at least one data structure configured to correlate the coded variable representative of the geographic or network topological commonality to the secured MAC addresses of the individual ones of at least the portion of the plurality of computerized client devices that share the commonality;
      receive data representative of a request for digitally rendered content from at least one of the portion of the plurality of computerized client devices;
      determine, based at least in part on the correlation of the coded variable representative of the geographic or network topological commonality to the secured MAC addresses of the individual ones of at least the portion of the plurality of computerized client devices that share the commonality, whether the requested digitally rendered content is among a plurality of digitally rendered content then-currently provided to a network-defined group to which the individual ones of at least the portion of the plurality of computerized client devices are associated; and
      based at least on a determination that the requested digitally rendered content is not among the plurality of digitally rendered content then-currently provided to the network-defined group, cause the requested digitally rendered content to be added to a multi-program transport stream (MPTS) provided to the individual ones of at least the portion of the plurality of computerized client devices.

6. The computerized network apparatus of claim 5, wherein the coded variable comprises a multi-bit binary coded variable that is not human readable, and which must be decoded in order to extract information therefrom.

7. The computerized network apparatus of claim 5, wherein the at least one computer program is further configured to, when executed on the processor apparatus:
utilize the at least one data structure to select, from among a plurality of digitally rendered secondary content, at least one of the plurality of digitally rendered secondary content, the at least one of the plurality of digitally rendered secondary content targeted to the at least one of the portion of the plurality of computerized client devices; and
deliver to the at least one of the portion of the plurality of computerized client devices the at least one of the plurality of digitally rendered secondary content without decryption of the MAC address thereof.

8. The computerized network apparatus of claim 7, wherein the delivery of the at least one of the plurality of digitally rendered secondary content comprises a switch of a subset of all content available at the hub to at least the at least one of the portion of the plurality of computerized client devices in order to conserve bandwidth within the switched content delivery broadcast network.

9. The computerized network apparatus of claim 5, wherein the geographic or network topological commonality comprises a commonality selected from the group consisting of: (i) common zip code, and (ii) common network service group (SG).

10. Computer readable apparatus comprising a non-transitory storage medium, the non-transitory storage medium comprising at least one computer program having a plurality of instructions, the plurality of instructions configured to, when executed on a processing apparatus:
obtain a first identifying value associated with a computerized client device;
utilize the first identifying value to generate a second identifying value, wherein the second identifying value obfuscates the first identifying value;
determine a correlation between the second identifying value and at least one data element, the at least one data element selected from at least one of: (i) demographic data, (ii) geographic data, or (iii) psychographic data; and
based at least in part on the determination, cause a switch of at least one broadcast content option to the computerized client device via use of at least one switching node of a content delivery network having a switched broadcast architecture;
wherein the switch of the at least one broadcast content option comprises:
identification of at least one of a plurality of digitally rendered content being then-currently broadcast in a digital content stream to at least the computerized client device as a candidate for removal from the digital content stream, the identification based at least in part on a prescribed threshold related to viewing activity associated with the at least one of the plurality of digitally rendered content;
a determination that the removal is appropriate, the determination based at least on a network resource availability associated with the computerized client device; and
a replacement of the at least one of the plurality of digitally rendered content with the at least one broadcast content option for delivery in the digital content stream broadcast to at least the computerized client device, the replacement based at least on the identification and the determination.

11. The computer readable apparatus of claim 10, wherein the utilization of the first identifying value to generate the second identifying value comprises algorithmic processing of an identifying parameter to form a secure identifying parameter, the secure identifying parameter configured to anonymize an identity of at least one of (i) the computerized client device, or (ii) the user associated with the computerized client device.

12. The computer readable apparatus of claim 11, wherein the plurality of instructions configured to, when executed on the processing apparatus:
correlate the identifying parameter with a second parameter, the identifying parameter comprising an identification value unique to the computerized client device, the second parameter comprising a parameter relating to viewership data associated with the user associated with computerized client device; and
cause delivery of digital advertising content in the digital content stream, the digital advertising content targeted to the user based at least in part on the second parameter.

13. The computer readable apparatus of claim 12, wherein the second parameter comprises at least one of (i) a telephone area code, or (ii) a telephone exchange; and
the delivery of the digital advertising content comprises delivery of the digital advertising content to the computerized client device disposed within a location associated with the at least one of: (i) the telephone area code or (ii) the telephone exchange.

14. The computer readable apparatus of claim 12, wherein:
the second parameter indicates a particular group in which the computerized client device is included, wherein the inclusion of the computerized client device in the particular group configured to vary as a function of time;
the plurality of instructions are further configured to, when executed on the processing apparatus, periodically evaluate the inclusion of the computerized client device in the particular group; and
the switch of the at least one broadcast content option to the computerized client device is based at least in part on at least one instance of the periodical evaluation.

15. The computer readable apparatus of claim 10, wherein:
the provision of the first identifying value comprises provision of a TUNER identifier (ID); and
the utilization of the first identifying value to generate the second identifying value comprises generation of a cryptographic hash value based at least in part on the TUNER ID.

16. The computer readable apparatus of claim 10, wherein:
the provision of the first identifying value comprises providing a media access control (MAC) address; and
the utilization of the first identifying value to generate the second identifying value comprises generation of a cryptographic hash value based at least in part on the MAC address.

17. The computer readable apparatus of claim 10, wherein the switch of the at least one broadcast content option to the computerized client device via use of the at least one switching node comprises a switch of a subset of all content available at the at least one switching node to a plurality of computerized client devices having at least one of a geographic commonality or network topological commonality with the computerized client device, in order to conserve bandwidth within the switched broadcast architecture.

18. The computer readable apparatus of claim 17, wherein the geographic commonality or network topological commonality comprises a commonality selected from the group consisting of: (i) common zip code, and (ii) common network service group (SG).

19. The computer readable apparatus of claim 10, wherein the second identifying value comprises a multi-bit binary coded variable that is not human readable, and which must be decoded in order to extract information therefrom.

* * * * *